United States Patent
Makiguchi et al.

(10) Patent No.: US 11,706,402 B2
(45) Date of Patent: Jul. 18, 2023

(54) IMAGE GENERATION APPARATUS, IMAGE GENERATION METHOD, AND PROGRAM

(71) Applicant: NIPPON TELEGRAPH AND TELEPHONE CORPORATION, Tokyo (JP)

(72) Inventors: Motohiro Makiguchi, Tokyo (JP); Hideaki Takada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 30 days.

(21) Appl. No.: 17/614,987

(22) PCT Filed: May 31, 2019

(86) PCT No.: PCT/JP2019/021743
§ 371 (c)(1),
(2) Date: Nov. 29, 2021

(87) PCT Pub. No.: WO2020/240827
PCT Pub. Date: Dec. 3, 2020

(65) Prior Publication Data
US 2022/0239894 A1 Jul. 28, 2022

(51) Int. Cl.
*H04N 13/366* (2018.01)
*H04N 13/156* (2018.01)
(Continued)

(52) U.S. Cl.
CPC ......... *H04N 13/366* (2018.05); *G06T 7/0002* (2013.01); *H04N 13/156* (2018.05);
(Continued)

(58) Field of Classification Search
CPC .. H04N 13/366; H04N 13/156; H04N 13/363; H04N 13/111; G06T 7/0002;
(Continued)

(56) References Cited

U.S. PATENT DOCUMENTS

| | | | |
|---|---|---|---|
| 2011/0026809 A1* | 2/2011 | Jeong | H04N 13/111 382/154 |
| 2011/0255592 A1* | 10/2011 | Sung | H04N 13/111 375/E7.141 |

(Continued)

OTHER PUBLICATIONS

Makiguchi et al. (2017) "Smooth Motion Parallax Glassless 3D Screen System Using Linear Blending of Viewing tones and Spatially Imaged Iris Plane" SID 2017 Digest, vol. 48, No. 1, pp. 903-906.

*Primary Examiner* — Tung T Vo

(57) ABSTRACT

Provided is an image generation technology capable of suppressing unpleasantness associated with fluctuation in image quality caused by the viewer's viewpoint movement. A synthesis ratio determination unit of an image generation apparatus includes: an image quality evaluation index calculation unit that generates a synthesis image $J_1$ from an observation viewpoint image $I_1$ and an intermediate viewpoint image $I_2$, and a synthesis image $J_3$ from an observation viewpoint image $I_3$ and an intermediate viewpoint image $I_2$, for a plurality of synthesis ratios, calculates an image quality evaluation index in an observation viewpoint $V_1$, an image quality evaluation index in an intermediate viewpoint $V_2$, and an image quality evaluation index in an observation viewpoint $V_3$ by using the synthesis images $J_1$ and $J_3$, and calculates a variation v of an image quality evaluation index by using the image quality evaluation index in the observation viewpoint $V_1$, the image quality evaluation index in the intermediate viewpoint $V_2$, and the image quality evaluation index in the observation viewpoint $V_3$; and an image quality evaluation index comparison unit that determines a synthesis ratio A based on the variation v of the image quality evaluation index.

9 Claims, 21 Drawing Sheets

(51) Int. Cl.
  *G06T 7/00* (2017.01)
  *H04N 13/363* (2018.01)
(52) U.S. Cl.
  CPC . *H04N 13/363* (2018.05); *G06T 2207/20212* (2013.01); *G06T 2207/30168* (2013.01)
(58) Field of Classification Search
  CPC . G06T 2207/20212; G06T 2207/30168; G06T 15/205; G06T 15/503
  USPC .......................................................... 348/51
  See application file for complete search history.

(56) References Cited

U.S. PATENT DOCUMENTS

| | | | | |
|---|---|---|---|---|
| 2013/0095920 | A1* | 4/2013 | Patiejunas ............ | H04N 13/271 463/31 |
| 2013/0222534 | A1* | 8/2013 | Rusanovskyy ...... | H04N 13/271 348/54 |
| 2015/0341614 | A1* | 11/2015 | Senoh .................. | H04N 13/161 348/43 |

* cited by examiner

IMAGE GENERATION APPARATUS, IMAGE GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/021743, filed on 31 May 2019, the disclosure of which is hereby incorporated herein by reference in its entirety.

TECHNICAL FIELD

The present invention relates to an image generation technique.

BACKGROUND ART

A technique has been proposed in which a three-dimensional image with motion parallax can be viewed by the naked eye by projecting a plurality of viewpoint images having parallax in the horizontal direction by a plurality of projectors, and controlling the spread property and the focusing property of the screen for the image corresponding to the viewpoint position of the viewer (for example, the positions of both eyes) to be visually recognized. Among these, a technique that is capable of projecting a three-dimensional image with a sparser projector interval (that is, a small number of projectors) than conventionally by utilizing a mechanism related to perception called linear blending has been proposed (NPL 1).

CITATION LIST

Non Patent Literature

NPL 1: M. Makiguchi, T. Kawakami, M. Sasai, H. Takada, "Smooth Motion Parallax Glassless 3D Screen System Using Linear Blending of Viewing Zones and Spatially Imaged Iris Plane," SID, Vol. 48, Issue 1, pp. 903-906, 2017.

SUMMARY OF THE INVENTION

Technical Problem

However, in the linear blending, two viewpoint images are perceived in a synthesized manner in the intermediate viewpoint, so the image quality is reduced. As a result, the image quality fluctuation occurs when the viewpoint moves from the position of the projector to which the image is output to the position between the projectors. For example, in FIG. 1, when the viewer moves in a sequence of $\alpha \to \beta \to \gamma$, the image quality fluctuates from good→poor→good. This is because a viewer visually recognizes only a single viewpoint image (image 1 or image 2) at the viewpoint position $\alpha$ or the viewpoint position $\gamma$, while the viewer visually recognizes an image that is synthesized (visible at the same time) from the two viewpoint images (image 1 and image 2) at the viewpoint position $\beta$.

Then, an object of the present invention is to provide an image generation technology capable of suppressing unpleasantness associated with fluctuation in image quality caused by the viewer's viewpoint movement.

Means for Solving the Problem

One aspect of the present invention is an image generation apparatus wherein: k as a parameter representing an integer, and $P_1$ and $P_3$ as projectors; and a viewpoint corresponding to an installation position of a projector $P_{2k-1}$ as an observation viewpoint $V_{2k-1}$ ($1 \leq k \leq 2$), a viewpoint corresponding to an intermediate position of installation positions of the two adjacent projectors $P_1$ and $P_3$ as an intermediate viewpoint $V_2$, an image in the observation viewpoint $V_{2k-1}$ as an observation viewpoint image $I_{2k-1}$ ($1 \leq k \leq 2$), and an image in the intermediate viewpoint $V_2$ as an intermediate viewpoint image $I_2$, the image generation apparatus including: a synthesis ratio determination unit that determines a synthesis ratio A by using an observation viewpoint image $I_1$, the intermediate viewpoint image $I_2$, and an observation viewpoint image $I_3$; and an output image generation unit that generates an output image $S_1$ of the projector $P_1$ from the observation viewpoint image $I_1$ and the intermediate viewpoint image $I_2$, and an output image $S_3$ of the projector $P_3$ from the observation viewpoint image $I_3$ and the intermediate viewpoint image $I_2$, by using the synthesis ratio A, wherein the synthesis ratio determination unit includes: an image quality evaluation index calculation unit that generates a synthesis image $J_1$ from the observation viewpoint image $I_1$ and the intermediate viewpoint image $I_2$, and a synthesis image $J_3$ from the observation viewpoint image $I_3$ and the intermediate viewpoint image $I_2$, for a plurality of synthesis ratios (each synthesis ratio is a real number 0 or greater and 1 or smaller), calculates an image quality evaluation index in an observation viewpoint $V_1$, an image quality evaluation index in the intermediate viewpoint $V_2$, and an image quality evaluation index in an observation viewpoint $V_3$ by using the synthesis images $J_1$ and $J_3$, and calculates a variation v of an image quality evaluation index by using the image quality evaluation index in the observation viewpoint $V_1$, the image quality evaluation index in the intermediate viewpoint $V_2$, and the image quality evaluation index in the observation viewpoint $V_3$; and an image quality evaluation index comparison unit that determines the synthesis ratio A based on the variation v of the image quality evaluation index.

One aspect of the present invention is an image generation apparatus wherein: K as an integer greater than or equal to 3, k as an parameter representing an integer, and $P_1, P_3, \ldots, P_{2K-1}$ as projectors installed aligned in a single row; a viewpoint corresponding to an installation position of a projector $P_{2k-1}$ as an observation viewpoint $V_{2k-1}$ ($1 \leq k \leq K$), a viewpoint corresponding to an intermediate position of installation positions of two adjacent projectors $P_{2k-1}$ and $P_{2k+1}$ as an intermediate viewpoint $V_{2k}$ ($1 \leq k \leq K-1$), an image in the observation viewpoint $V_{2k-1}$ as an observation viewpoint image $I_{2k-1}$ ($1 \leq k \leq K$), and an image in the intermediate viewpoint $V_{2k}$ as an intermediate viewpoint image $I_{2k}$ ($1 \leq k \leq K-1$); and a set of the observation viewpoint image $I_{2k-1}$, the intermediate viewpoint image $I_{2k}$, and an observation viewpoint image $I_{2k+1}$ as a block $B_k$ ($1 \leq k \leq K-1$), the image generation apparatus comprising: a synthesis ratio determination unit that determines a synthesis ratio $A_k$ in the block $B_k$ by using an intermediate viewpoint image $I_{2k-2}$, the observation viewpoint image $I_{2k-1}$, the intermediate viewpoint image $I_{2k}$, the observation viewpoint image $I_{2k+1}$, and an intermediate viewpoint image $I_{2k+2}$, for the block $B_k$ ($1 \leq k \leq K-1$) (where $I_0 = I_2$, $I_{2K} = I_{2K-2}$); and an output image generation unit that generates an output image $S_{2k-1}$ of the projector $P_{2k-1}$ from the intermediate viewpoint image $I_{2k-2}$, the observation viewpoint image $I_{2k-1}$, and the intermediate viewpoint image $I_{2k}$ by using synthesis ratios $A_{k-1}, A_k$, for k satisfying $1 \leq k \leq K$ (where $A_0 = A_1$, $A_K = A_{K-1}$, $I_0 = I_2$, $I_{2K} = I_{2K-2}$), wherein the synthesis ratio determination unit includes: an image quality evaluation index calculation unit that generates a synthesis image $J_{2k-1}$ from the intermediate viewpoint image $I_{2k-2}$, the observation viewpoint image $I_{2k-1}$, and the intermediate viewpoint image $I_{2k}$, and a synthesis image $J_{2k+1}$ from the intermediate viewpoint image $I_{2k}$, the observation viewpoint image $I_{2k+1}$, and the intermediate viewpoint image $I_{2k+2}$, for a plurality of synthesis ratios (each synthesis ratio is a real number 0 or greater and 1 or smaller), calculates an image quality evaluation index in the observation viewpoint $V_{2k-1}$, an image quality evaluation index in the intermediate viewpoint $V_{2k}$, and an image quality evaluation index in an observation viewpoint $V_{2k+1}$ by using the synthesis images $J_{2k-1}, J_{2k+1}$, and calculates a variation $v_k$ of an image quality evaluation index in the block $B_k$ by using the image quality evaluation index in the observation viewpoint $V_{2k-1}$, the image quality evaluation index in the intermediate viewpoint $V_{2k}$, and the image quality evaluation index in the observation viewpoint $V_{2k+1}$; and an image quality evaluation index comparison unit that determines the synthesis ratio $A_k$ based on the variation $v_k$ of the image quality evaluation index in the block $B_k$.

One aspect of the present invention is an image generation apparatus wherein K as an integer greater than or equal to 3, k as an parameter representing an integer, and $P_1, P_3, \ldots, P_{2K-1}$ as projectors installed aligned in a circular alignment, the projectors being for projecting an image onto a circular screen; a viewpoint corresponding to an installation position of a projector $P_{2k-1}$ as an observation viewpoint $V_{2k-1}$ ($1 \leq k \leq K$), a viewpoint corresponding to an intermediate position of installation positions of two adjacent projectors $P_{2k-1}$ and $P_{2k+1}$ (where $P_{2K+1}=P_1$) as an intermediate viewpoint $V_{2k}$ ($1 \leq k \leq K$), an image in the observation viewpoint $V_{2k-1}$ as an observation viewpoint image $I_{2k-1}$ ($1 \leq k \leq K$), and an image in the intermediate viewpoint $V_{2k}$ as an intermediate viewpoint image $I_{2k}$ ($1 \leq k \leq K$); and a set of the observation viewpoint image $I_{2k-1}$, the intermediate viewpoint image $I_{2k}$, and an observation viewpoint image $I_{2k+1}$ (where $I_{2K+1}=I_1$) as a block $B_k$ ($1 \leq k \leq K$), the image generation apparatus comprising: a synthesis ratio determination unit that determines a synthesis ratio $A_k$ in the block $B_k$ by using an intermediate viewpoint image $I_{2k-2}$, the observation viewpoint image $I_{2k-1}$, the intermediate viewpoint image $I_{2k}$, the observation viewpoint image $I_{2k+1}$, and an intermediate viewpoint image $I_{2k+2}$, for the block $B_k$ ($1 \leq k \leq K$) (where $I_0=I_{2K}, I_{2K+1}=I_1, I_{2K+2}=I_2$); and an output image generation unit that generates an output image $S_{2k-1}$ of the projector $P_{2k-1}$ from the intermediate viewpoint image $I_{2k-2}$, the observation viewpoint image $I_{2k-1}$, and the intermediate viewpoint image $I_{2k}$ by using synthesis ratios $A_{k-1}, A_k$, for k satisfying $1 \leq k \leq K$ (where $A_0=A_K, I_0=I_{2K}$), wherein the synthesis ratio determination unit includes: an image quality evaluation index calculation unit that generates a synthesis image $J_{2k-1}$ from the intermediate viewpoint image $I_{2k-2}$, the observation viewpoint image $I_{2k-1}$, and the intermediate viewpoint image $I_{2k}$, and a synthesis image $J_{2k+1}$ from the intermediate viewpoint image $I_{2k}$, the observation viewpoint image $I_{2k+1}$, and the intermediate viewpoint image $I_{2k+2}$, for a plurality of synthesis ratios (each synthesis ratio is a real number 0 or greater and 1 or smaller), calculates an image quality evaluation index in the observation viewpoint $V_{2k-1}$, an image quality evaluation index in the intermediate viewpoint $V_{2k}$, and an image quality evaluation index in an observation viewpoint $V_{2k+1}$ by using the synthesis images $J_{2k-1}, J_{2k+1}$, and calculates a variation $v_k$ of an image quality evaluation index in the block $B_k$ by using the image quality evaluation index in the observation viewpoint $V_{2k-1}$, the image quality evaluation index in the intermediate viewpoint $V_{2k}$, and the image quality evaluation index in the observation viewpoint $V_{2k+1}$ (where $J_{2K+1}=J_1, V_{2K+1}=V_1$); and an image quality evaluation index comparison unit that determines the synthesis ratio $A_k$ based on the variation $v_k$ of the image quality evaluation index in the block $B_k$.

One aspect of the present invention is an image generation apparatus wherein: K as an integer greater than or equal to 3, k as an parameter representing an integer, and $P_1, P_3, \ldots, P_{2K-1}$ as projectors installed aligned in a single row; a viewpoint corresponding to an installation position of a projector $P_{2k-1}$ as an observation viewpoint $V_{2k-1}$ ($1 \leq k \leq K$), a viewpoint corresponding to an intermediate position of installation positions of two adjacent projectors $P_{2k-1}$ and $P_{2k+1}$ as an intermediate viewpoint $V_{2k}$ ($1 \leq k \leq K-1$), an image in the observation viewpoint $V_{2k-1}$ as an observation viewpoint image $I_{2k-1}$ ($1 \leq k \leq K$), and an image in the intermediate viewpoint $V_{2k}$ as an intermediate viewpoint image $I_{2k}$ ($1 \leq k \leq K-1$); a set of the observation viewpoint image $I_{2k-1}$, the intermediate viewpoint image $I_{2k}$, and an observation viewpoint image $I_{2k+1}$ as a block $B_k$ ($1 \leq k \leq K-1$); and $\varphi$ as a real number that satisfies $0 \leq \varphi \leq \pi/2$, the image generation apparatus comprising: a pseudo viewpoint image generation unit that generates a parallax inducing edge $D_\varphi$ having a phase difference from the intermediate viewpoint image $I_{2k}$ being $\varphi$ by using the intermediate viewpoint image $I_{2k}$ and the observation viewpoint image $I_{2k+1}$, for the intermediate viewpoint image $I_{2k}$ ($1 \leq k \leq K-1$), generates a pseudo intermediate viewpoint image $I_{2k}{}^{(R)}$ by adding the parallax inducing edge $D_\varphi$ to the intermediate viewpoint image $I_{2k}$, and generates a pseudo intermediate viewpoint image $I_{2k}{}^{(L)}$ by adding a positive/negative reverse image of the parallax inducing edge $D_\varphi$ to the intermediate viewpoint image $I_{2k}$; a synthesis ratio determination unit that determines a synthesis ratio $A_k$ in the block $B_k$ by using a pseudo intermediate viewpoint image $I_{2k-2}{}^{(R)}$, the observation viewpoint image $I_{2k-1}$, the pseudo intermediate viewpoint image $I_{2k}{}^{(L)}$, the pseudo intermediate viewpoint image $I_{2k}{}^{(R)}$, the observation viewpoint image $I_{2k+1}$, and a pseudo intermediate viewpoint image $I_{2k+2}{}^{(L)}$, for the block $B_k$ ($1 \leq k \leq K-1$) (where $I_0{}^{(R)}=I_2{}^{(R)}, I_{2K}{}^{(L)}=I_{2K-2}{}^{(L)}$); and an output image generation unit that generates an output image $S_{2k-1}$ of the projector $P_{2k-1}$ from the pseudo intermediate viewpoint image $I_{2k-2}{}^{(R)}$, the observation viewpoint image $I_{2k-1}$, and the pseudo intermediate viewpoint image $I_{2k}{}^{(L)}$ by using synthesis ratios $A_{k-1}, A_k$, for k satisfying $1 \leq k \leq K$ (where $A_0=A_1, A_K=A_{K-1}, I_0{}^{(R)}=I_2{}^{(R)}, I_{2K}{}^{(L)}=I_{2K-2}{}^{(L)}$), wherein the synthesis ratio determination unit includes: an image quality evaluation index calculation unit that generates a synthesis image $J_{2k-1}$ from the pseudo intermediate viewpoint image $I_{2k-2}{}^{(R)}$, the observation viewpoint image $I_{2k-1}$, and the pseudo intermediate viewpoint image $I_{2k}{}^{(L)}$, and a synthesis image $J_{2k+1}$ from the pseudo intermediate viewpoint image $I_{2k}{}^{(R)}$, the observation viewpoint image $I_{2k+1}$, and the pseudo intermediate viewpoint image $I_{2k+2}{}^{(L)}$, for a plurality of synthesis ratios (each synthesis ratio is a real number 0 or greater and 1 or smaller), calculates an image quality evaluation index in the observation viewpoint $V_{2k-1}$, an image quality evaluation index in the intermediate viewpoint $V_{2k}$, and an image quality evaluation index in an observation viewpoint $V_{2k+1}$ by using the synthesis images $J_{2k-1}, J_{2k+1}$, and calculates a variation $v_k$ of an image quality evaluation index in the block $B_k$ by using the image quality evaluation index in the observation viewpoint $V_{2k-1}$, the image quality evaluation index in the intermediate viewpoint $V_{2k}$, and the image quality evaluation index in the observation viewpoint $V_{2k+1}$; and an image quality evaluation index comparison unit that determines the synthesis ratio $A_k$ based on the variation $v_k$ of the image quality evaluation index in the block $B_k$.

One aspect of the present invention is an image generation apparatus wherein: K as an integer greater than or equal to 3, k as an parameter representing an integer, and $P_1$, $P_3$, ..., $P_{2K-1}$ as projectors installed aligned in a circular alignment, the projectors being for projecting an image onto a circular screen; a viewpoint corresponding to an installation position of a projector $P_{2k-1}$ as an observation viewpoint $V_{2k-1}$ (1≤k≤K), a viewpoint corresponding to an intermediate position of installation positions of two adjacent projectors $P_{2k-1}$ and $P_{2k+1}$ (where $P_{2K+1}=P_1$) as an intermediate viewpoint $V_{2k}$ (1≤k≤K), an image in the observation viewpoint $V_{2k-1}$ as an observation viewpoint image $I_{2k-1}$ (1≤k≤K), and an image in the intermediate viewpoint $V_{2k}$ as an intermediate viewpoint image $I_{2k}$ (1≤k≤K); a set of the observation viewpoint image $I_{2k-1}$, the intermediate viewpoint image $I_{2k}$, and an observation viewpoint image $I_{2k+1}$ (where $I_{2K+1}=I_1$) as a block $B_k$ (1≤k≤K); and $\varphi$ as a real number that satisfies $0<\varphi\leq\pi/2$, the image generation apparatus comprising: a pseudo viewpoint image generation unit that generates a parallax inducing edge $D_\varphi$ having a phase difference from the intermediate viewpoint image $I_{2k}$ being $\varphi$ by using the intermediate viewpoint image $I_{2k}$ and the observation viewpoint image $I_{2k+1}$, for the intermediate viewpoint image $I_{2k}$ (1≤k≤K), generates a pseudo intermediate viewpoint image $I_{2k}^{(R)}$ by adding the parallax inducing edge $D_\varphi$ to the intermediate viewpoint image $I_{2k}$, and generates a pseudo intermediate viewpoint image $I_{2k}^{(L)}$ by adding a positive/negative reverse image of the parallax inducing edge $D_\varphi$ to the intermediate viewpoint image $I_{2k}$ (where $I_{2K+1}=I_1$); a synthesis ratio determination unit that determines a synthesis ratio $A_k$ in the block $B_k$ by using a pseudo intermediate viewpoint image $I_{2k-2}^{(R)}$, the observation viewpoint image $I_{2k-1}$, the pseudo intermediate viewpoint image $I_{2k}^{(L)}$, the pseudo intermediate viewpoint image $I_{2k}^{(R)}$, the observation viewpoint image $I_{2k+1}$, and a pseudo intermediate viewpoint image $I_{2k+2}^{(L)}$, for the block $B_k$ (1≤k≤K) (where $I_0^{(R)}=I_{2K}^{(R)}$, $I_{2K+1}=I_1$, $I_{2K+2}^{(L)}=I_2^{(L)}$); and an output image generation unit that generates an output image $S_{2k-1}$ of the projector $P_{2k-1}$ from the pseudo intermediate viewpoint image $I_{2k-2}^{(R)}$, the observation viewpoint image $I_{2k-1}$, and the pseudo intermediate viewpoint image $I_{2k}^{(L)}$ by using synthesis ratios $A_{k-1}$, $A_k$, for k satisfying 1≤k≤K (where $A_0=A_K$, $I_0^{(R)}=I_{2K}^{(R)}$), wherein the synthesis ratio determination unit includes: an image quality evaluation index calculation unit that generates a synthesis image $J_{2k-1}$ from the pseudo intermediate viewpoint image $I_{2k-2}^{(R)}$, the observation viewpoint image $I_{2k-1}$, and the pseudo intermediate viewpoint image $I_{2k}^{(L)}$, and a synthesis image $J_{2k+1}$ from the pseudo intermediate viewpoint image $I_{2k}^{(R)}$, the observation viewpoint image $I_{2k+1}$, and the pseudo intermediate viewpoint image $I_{2k+2}^{(L)}$, for a plurality of synthesis ratios (each synthesis ratio is a real number 0 or greater and 1 or smaller), calculates an image quality evaluation index in the observation viewpoint $V_{2k-1}$, an image quality evaluation index in the intermediate viewpoint $V_{2k}$, and an image quality evaluation index in an observation viewpoint $V_{2k+1}$ by using the synthesis images $J_{2k-1}$, $J_{2k+1}$, and calculates a variation $v_k$ of an image quality evaluation index in the block $B_k$ by using the image quality evaluation index in the observation viewpoint $V_{2k-1}$, the image quality evaluation index in the intermediate viewpoint $V_{2k}$, and the image quality evaluation index in the observation viewpoint $V_{2k+1}$ (where $J_{2K+1}=J_1$, $V_{2K+1}=V_1$), and an image quality evaluation index comparison unit that determines the synthesis ratio $A_k$ based on the variation $v_k$ of the image quality evaluation index in the block $B_k$.

Effects of the Invention

According to the present invention, it is possible to suppress unpleasantness associated with fluctuation in image quality caused by the viewer's viewpoint movement.

DESCRIPTION OF EMBODIMENTS

Hereinafter, embodiments of the present invention will be described in detail. Components having the same function are denoted by the same reference signs, and redundant description thereof will be omitted.

Prior to describing each embodiment, the method of notation herein will be described.

^ (caret) represents the superscript. For example, $x^{y^z}$ represents $y^z$ is the superscript to x, and $x_{y^z}$ represents $y^z$ is the subscript to x. _ (underscore) represents the subscript.

For example, $x^{y\_z}$ represents $y_z$ is the superscript to x, and $x_{y\_z}$ represents $y_z$ is the subscript to x.

A superscript "^" or "~", such as ^x or ~x to a character x, should be described otherwise above "x", but are described as ^x or ~x, under the limitations of the written description herein.

The viewpoint corresponding to the installation position of the projector is referred to as an observation viewpoint, and the viewpoint corresponding to the intermediate position of the installation positions of two adjacent projectors is referred to as an intermediate viewpoint. The image in the observation viewpoint is referred to as an observation viewpoint image and the image in the intermediate viewpoint is referred to as an intermediate viewpoint image.

First Embodiment

The image generation apparatus 100 generates an image (hereinafter referred to as an output image) output by two projectors. These two projectors are referred to as $P_1$ and $P_3$. The viewpoint corresponding to the installation position of the projector $P_{2k-1}$ is referred to as an observation viewpoint $V_{2k-1}$ ($1 \leq k \leq 2$), the viewpoint corresponding to the intermediate position of the installation positions of the two adjacent projectors $P_1$ and $P_3$ is referred to as an intermediate viewpoint $V_2$, the image corresponding to the observation viewpoint $V_{2k-1}$ is referred to as an observation viewpoint image $I_{2k-1}$ ($1 \leq k \leq 2$), and the image in the intermediate viewpoint $V_2$ is referred to as an intermediate viewpoint image $I_2$. Here, k is a parameter representing an integer.

Figure 1:
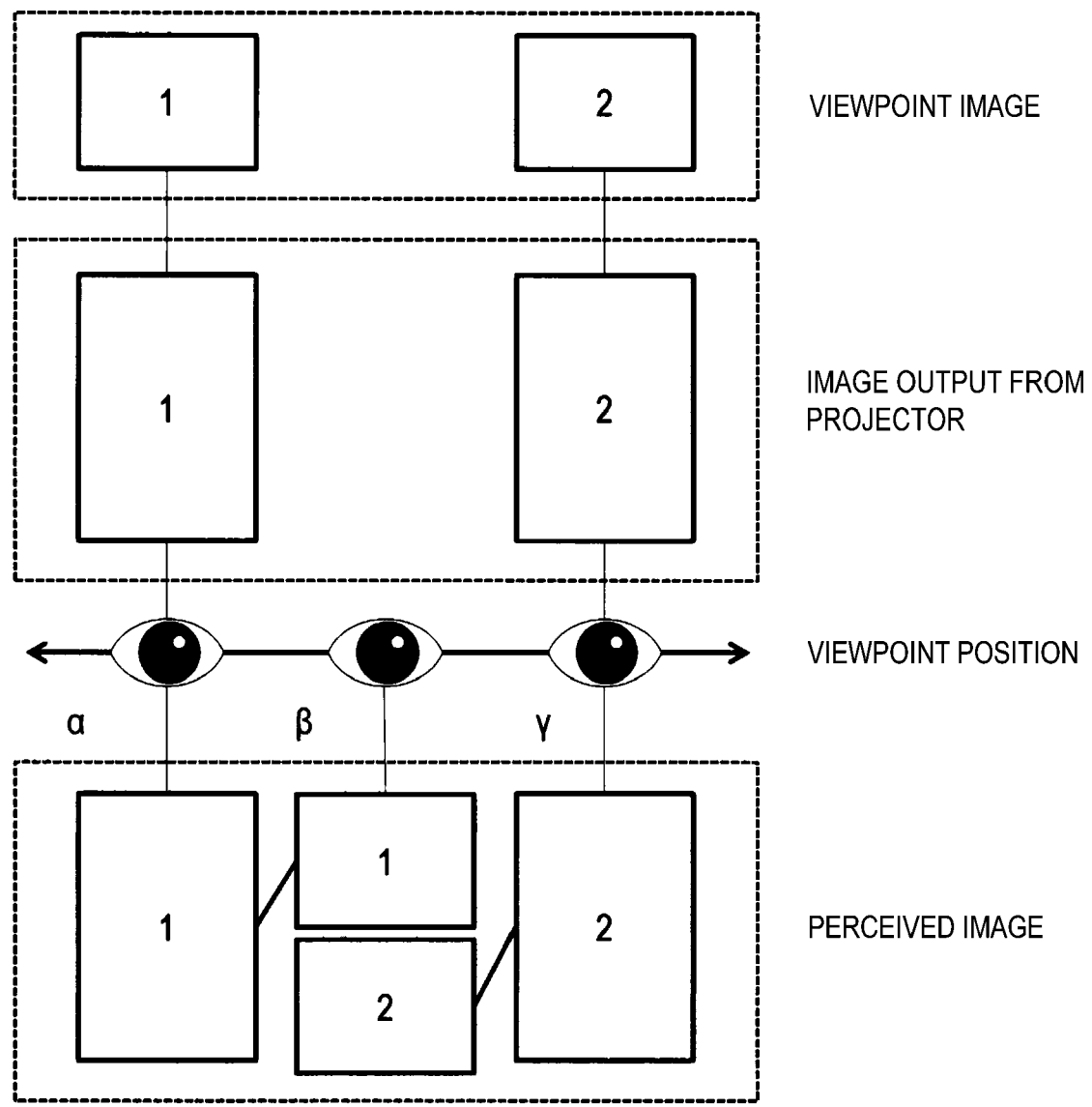
FIG. 1 is a diagram illustrating linear blending.
Figure 2:
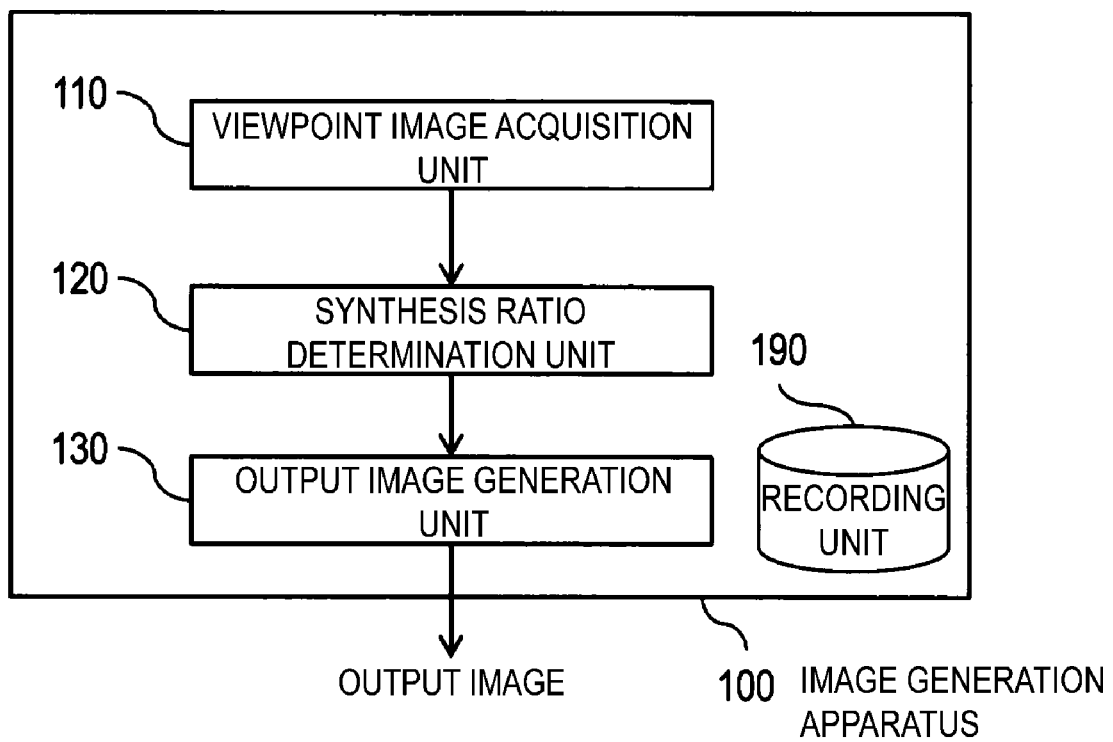
FIG. 2 is a block diagram illustrating a configuration of an image generation apparatus 100.
Figure 3:
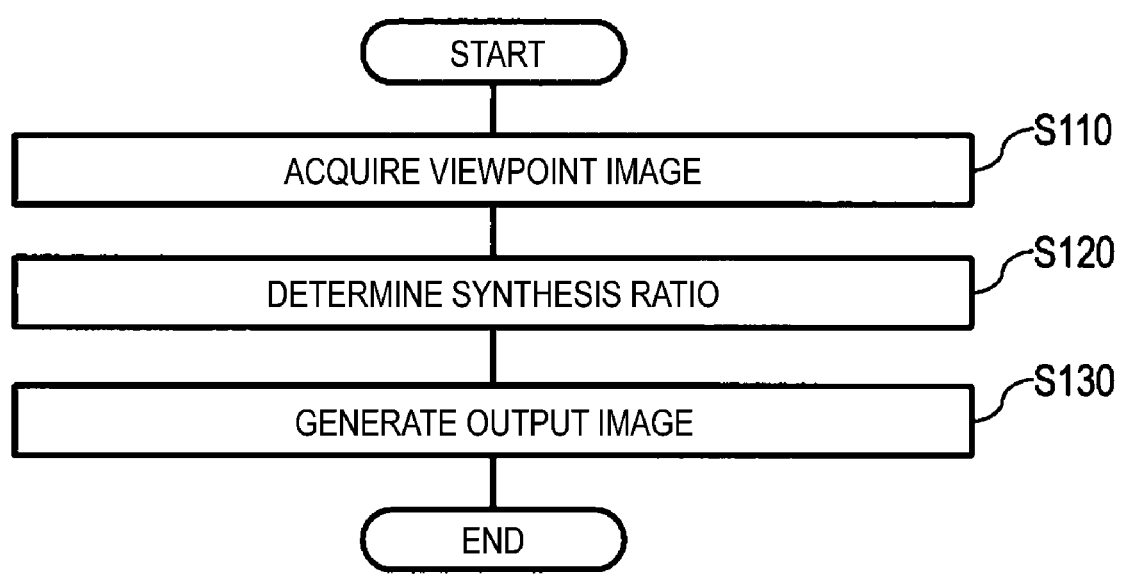
FIG. 3 is a flowchart illustrating an operation of the image generation apparatus 100.

Hereinafter, an image generation apparatus 100 will be described with reference to FIGS. 2 and 3. FIG. 2 is a block diagram illustrating a configuration of the image generation apparatus 100. FIG. 3 is a flowchart illustrating an operation of the image generation apparatus 100. As illustrated in FIG. 2, the image generation apparatus 100 includes a viewpoint image acquisition unit 110, a synthesis ratio determination unit 120, an output image generation unit 130, and a recording unit 190. The recording unit 190 is a component configured to appropriately record information required for processing of the image generation apparatus 100.

The operation of the image generation apparatus 100 will be described in accordance with FIG. 3. In step S110, the viewpoint image acquisition unit 110 acquires and outputs an observation viewpoint image $I_1$, an intermediate viewpoint image $I_2$, and an observation viewpoint image $I_3$. Each viewpoint image is, for example, an image capturing a certain photographic subject by a camera installed at a position corresponding to each of the viewpoints.

Figure 4:
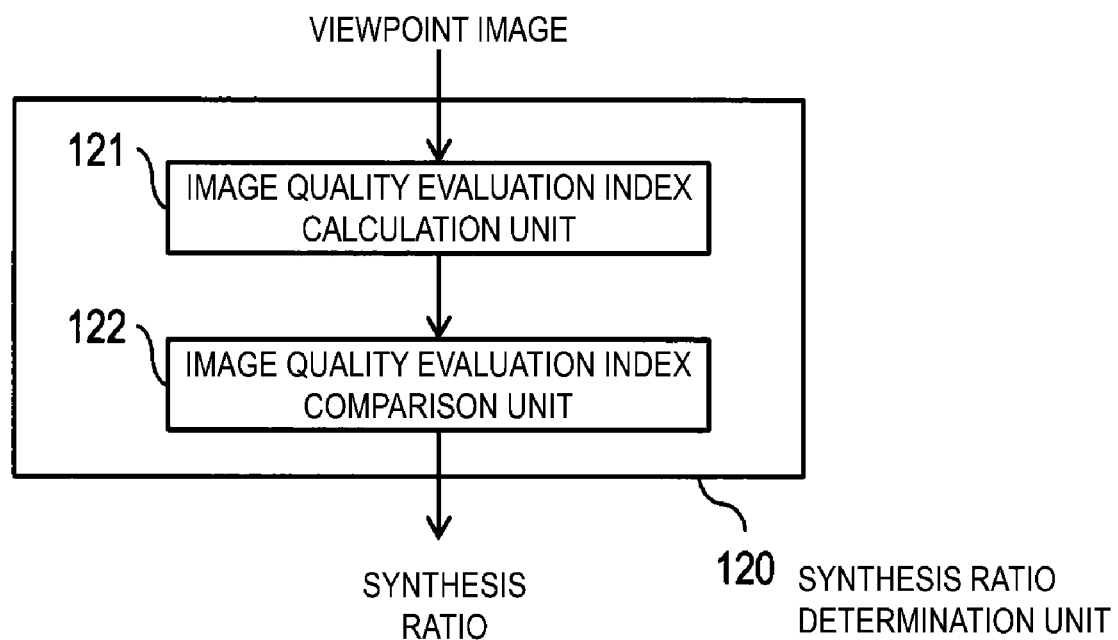
FIG. 4 is a block diagram illustrating a configuration of a synthesis ratio determination unit 120.
Figure 5:
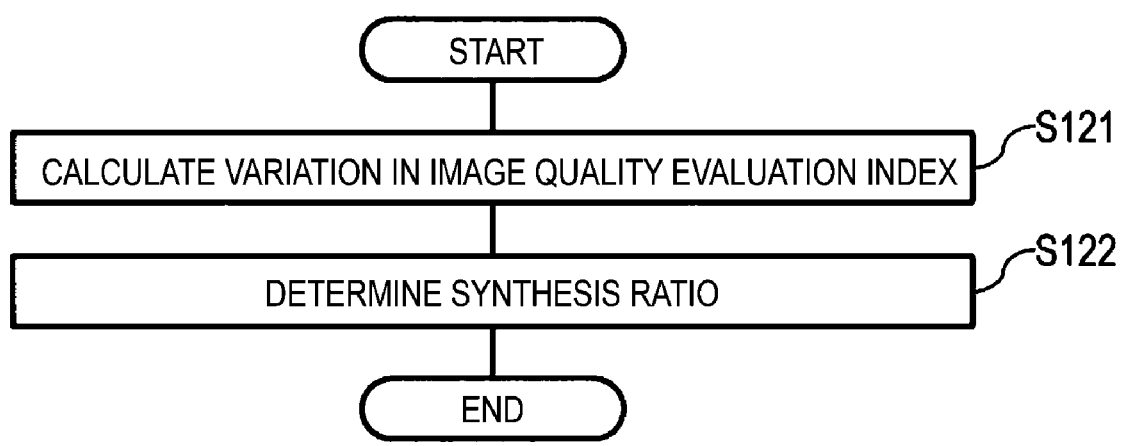
FIG. 5 is a flowchart illustrating an operation of the synthesis ratio determination unit 120.

In step S120, the synthesis ratio determination unit 120 uses the observation viewpoint image $I_1$, the intermediate viewpoint image $I_2$, and the observation viewpoint image $I_3$ acquired at S110 as inputs, and determines and outputs the synthesis ratio A by using the observation viewpoint image $I_1$, the intermediate viewpoint image $I_2$, and the observation viewpoint image $I_3$. Here, the synthesis ratio A is used when the output image generation unit 130 generates the output image. Hereinafter, the synthesis ratio determination unit 120 will be described with reference to FIGS. 4 to 5. FIG. 4 is a block diagram illustrating a configuration of the synthesis ratio determination unit 120. FIG. 5 is a flowchart illustrating an operation of the synthesis ratio determination unit 120. As illustrated in FIG. 4, the synthesis ratio determination unit 120 includes an image quality evaluation index calculation unit 121 and an image quality evaluation index comparison unit 122.

Figure 6:
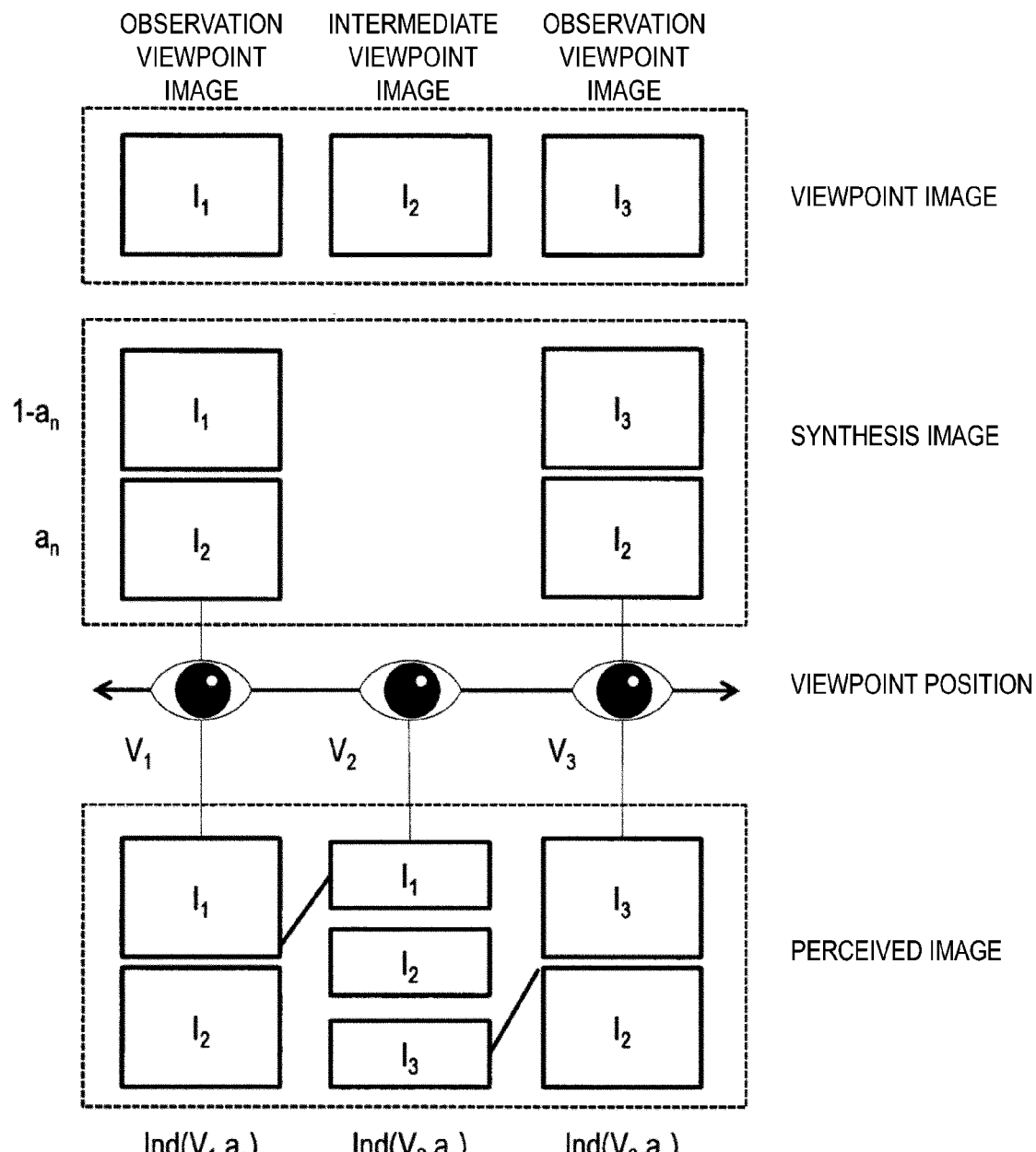
FIG. 6 is a diagram illustrating a state of processing performed by the synthesis ratio determination unit 120.

An operation of the synthesis ratio determination unit 120 will be described with reference to FIG. 5. In step S121, the image quality evaluation index calculation unit 121 generates a synthesis image $J_1$ from the observation viewpoint image $I_1$ and the intermediate viewpoint image $I_2$, and a synthesis image $J_3$ from the observation viewpoint image $I_3$ and the intermediate viewpoint image $I_2$ for N synthesis ratios an (where N is an integer of 1 or greater) ($0 \leq a_n \leq 1$, $1 \leq n \leq N$, n is a parameter represent an integer). The image quality evaluation index calculation unit 121 uses the synthesis images $J_1$ and $J_3$ to calculate the image quality evaluation index in the observation viewpoint $V_1$, the image quality evaluation index in the intermediate viewpoint $V_2$, and the image quality evaluation index in the observation viewpoint $V_3$. The image quality evaluation index calculation unit 121 calculates a variation v ($a_n$) of the image quality evaluation index by using the image quality evaluation index in the observation viewpoint $V_1$, the image quality evaluation index in the intermediate viewpoint $V_2$, and the image quality evaluation index in the observation viewpoint $V_3$. The variation v ($a_n$) of the image quality evaluation index can, for example, use an absolute value of the difference between the average value of the image quality evaluation index in the two observation viewpoints and the image quality evaluation in the intermediate viewpoint. Here, the synthesis ratio an is a value that gradually changes from 0 to 1, and is, for example, a value that changes from 0 to 1 by 0.1 (that is, $a_1=0$, $a_2=0.1$, $a_3=0.2$, ..., $a_{11}=1$). For an image quality evaluation index, for example, a mean squared error (MSE), a peak signal-to-noise ratio (PSNR), and a structural similarity (SSIM) can be used. Specific description will be given with reference to FIG. 6. The synthesis image $J_1$ at the observation viewpoint position $V_1$ is generated as $(1-a_n) \times I_1 + a_n \times I_2$. Similarly, the synthesis image $J_3$ at the observation viewpoint position $V_3$ is generated as $(1-a_n) \times I_3 + a_n \times I_2$. Thus, the perceived image at the observation viewpoint position $V_1$ and the perceived image at the observation viewpoint position $V_3$ are the synthesis image $J_1$ at the observation viewpoint position $V_1$ and the synthesis image $J_3$ at the observation viewpoint position $V_3$. The perceived image at the intermediate viewpoint position $V_2$ is the average of the synthesis image $J_1$ at the observation viewpoint position $V_1$ and the synthesis image $J_3$ at the observation viewpoint position $V_3$ (that is, $\frac{1}{2} \times (J_1+J_3)$). Then, the image quality evaluation index Ind ($V_1$, $a_n$) of the perceived image at the observation viewpoint position $V_1$ with respect to the synthesis ratio $a_n$, the image quality evaluation index Ind ($V_2$, $a_n$) of the perceived image at the intermediate viewpoint position $V_2$ with respect to the synthesis ratio $a_n$, and the image quality evaluation index Ind ($V_3$, $a_n$) of the perceived image at the observation viewpoint position $V_3$ with respect to the synthesis ratio $a_n$ are calculated, and the absolute value of the difference with respect to the synthesis ratio $a_n$, D ($a_n$)=|Ind ($V_2$, $a_n$)−½×(Ind ($V_1$, $a_n$)+Ind ($V_3$, $a_n$))| is calculated as the variation v ($a_n$) of the image quality evaluation index. Note that the absolute value D ($a_n$) of the difference used in the calculation of the variation v ($a_n$) of the image quality evaluation index is merely an example, and other methods may be used.

In step S122, the image quality evaluation index comparison unit 122 determines a synthesis ratio $a_n$ that minimizes the variation v ($a_n$) ($1 \leq n \leq N$) of the image quality evaluation index as the synthesis ratio A. Note that it is an example to determine the synthesis ratio A as the synthesis ratio $a_n$ where the variation v ($a_n$) ($1 \leq n \leq N$) in the image quality evaluation index is minimized, and any determination method may be used as long as the image quality evaluation index comparison unit 122 determines the synthesis ratio A based on the variation v ($a_n$) ($1 \leq n \leq N$) of the image quality evaluation index. For example, one of variations v ($a_n$) of the image quality evaluation index smaller than a predetermined threshold value may be determined as the synthesis ratio A, by using the predetermined threshold value (such as an acceptable value as a valuation in the image quality evaluation index defined by an image quality evaluation experiment or the like). Note that in a case where there is no variation v ($a_n$) in the image quality evaluation index that is smaller than the threshold value, the synthesis ratio $a_n$ where the variation v ($a_n$) ($1 \leq n \leq N$) in the image quality evaluation index is minimized may be determined as the synthesis ratio A.

In step S130, the output image generation unit 130 uses the observation viewpoint image $I_1$, the intermediate viewpoint image $I_2$, the observation viewpoint image $I_3$ acquired at S110, and the synthesis ratio A determined at S120 as inputs to generate and output the output image $S_1$ of the projector $P_1$ from the observation viewpoint image $I_1$ and the intermediate viewpoint image $I_2$ and the output image $S_3$ of the projector $P_3$ from the observation viewpoint image $I_3$ and the intermediate viewpoint image $I_2$ by using the synthesis ratio A. Here, the output image $S_1$ in the observation viewpoint position $V_1$ is generated as $(1-A) \times I_1 + A \times I_2$. Similarly, the output image $S_3$ in the observation viewpoint position $V_3$ is generated as $(1-A) \times I_3 + A \times I_2$.

Modified Example

In the above description, N synthesis ratio $a_n$ used in the generation of the synthesis image $J_1$ and the synthesis image $J_3$ have been described as being the same, but they are not necessary to be the same. For example, $N_1$ synthesis ratios $a_{1,\,n\_1}$ may be used to generate the synthesis image $J_1$, and $N_3$ synthesis ratios $a_{3,\,n\_3}$ may be used to generate the synthesis image $J_3$. In other words, in step S121, the image quality evaluation index calculation unit 121 generates the synthesis image $J_1$ from the observation viewpoint image $I_1$ and the intermediate viewpoint image $I_2$ with respect to the $N_1$ ($N_1$ is an integer of 1 or greater) synthesis ratios $a_{1,\,n1}$ ($0 \leq a_{1,\,n\_1} \leq 1$, $1 \leq n_1 \leq N_1$, $n_1$ is a parameter representing an integer), and the synthesis image $J_3$ from the observation viewpoint image $I_3$ and the intermediate viewpoint image $I_2$ with respect to the $N_3$ ($N_3$ is an integer of 1 or greater) synthesis ratios $a_{3,\,n3}$ ($0 \leq a_{3,\,n\_3} \leq 1$, $1 \leq n_3 \leq N_3$, $n_3$ is a parameter representing an integer). The image quality evaluation index calculation unit 121 uses the synthesis images $J_1$ and $J_3$ to calculate the image quality evaluation index in the observation viewpoint $V_1$, the image quality evaluation index in the intermediate viewpoint $V_2$, and the image quality evaluation index in the observation viewpoint $V_3$. The image quality evaluation index calculation unit 121 calculates a variation v ($a_{1,\,n\_1}$, $a_{3,\,n\_3}$) of the image quality evaluation index by using the image quality evaluation index in the observation viewpoint $V_1$, the image quality evaluation index in the intermediate viewpoint $V_2$, and the image quality evaluation index in the observation viewpoint $V_3$. In step S122, the image quality evaluation index comparison unit 122 determines synthesis ratios $a_{1,\,n\_1}$, $a_{3,\,n\_3}$ as a synthesis ratio (set) A ($=(A_{(1)}, A_{(3)})$) in which a variation v ($a_{1,\,n\_1}$, $a_{3,\,n\_3}$) ($1 \leq n1 \leq N_1$, $1 \leq n_3 \leq N_3$) of the image quality evaluation index is minimized. In step S130, the output image generation unit 130 uses the observation viewpoint image $I_1$, the intermediate viewpoint image $I_2$, the observation viewpoint image $I_3$ acquired at S110, and the synthesis ratio (set) A determined at S120 as inputs to generate and output the output image $S_1$ of the projector $P_1$ from the observation viewpoint image $I_1$ and the intermediate viewpoint image $I_2$ and the output image $S_3$ of the projector $P_3$ from the observation viewpoint image $I_3$ and the intermediate viewpoint image $I_2$ by using the synthesis ratio (set) A.

According to the invention of the present embodiment, it is possible to suppress unpleasantness associated with fluctuation in image quality caused by the viewer's viewpoint movement. The reason will be described below. Adding another viewpoint image to the viewpoint image degrades the image quality from the viewpoint image that is originally observed at that viewpoint. That is, by adding an intermediate viewpoint image to the output image, the image quality of the output image deteriorates, while the image quality of the intermediate viewpoint is relatively improved.

Second Embodiment

The image generation apparatus 200 generates an image (hereinafter referred to as an output image) that is output by K projectors (K is an integer of 3 or greater). These K projectors are referred to as $P_1, P_3, \ldots, P_{2K-1}$. The projectors $P_1, P_3, \ldots, P_{2K-1}$ are installed aligned in a single row. For example, the projectors $P_1, P_3, \ldots, P_{2K-1}$ may be installed on a straight line, and each projector may be a projector that projects an image onto a planar screen.

The viewpoint corresponding to the installation position of the projector $P_{2k-1}$ is referred to as an observation viewpoint $V_{2k-1}$ ($1 \leq k \leq K$), the viewpoint corresponding to the intermediate position of the installation positions of the two adjacent projectors $P_{2K-1}$ and $P_{2K+1}$ is referred to as an intermediate viewpoint $V_{2k}$ ($1 \leq k \leq K-1$), the image corresponding to the observation viewpoint $V_{2k-1}$ is referred to as an observation viewpoint image $I_{2k-1}$ ($1 \leq k \leq K$), and the image in the intermediate viewpoint $V_{2k}$ is referred to as an intermediate viewpoint image $I_{2k}$ ($1 \leq k \leq K-1$). Here, k is a parameter representing an integer.

The set of the observation viewpoint image $I_{2k-1}$, the intermediate viewpoint image $I_{2k}$, and the observation viewpoint image $I_{2k+1}$ are referred to as a block $B_k$ ($1 \leq k \leq K-1$).

Figure 7:
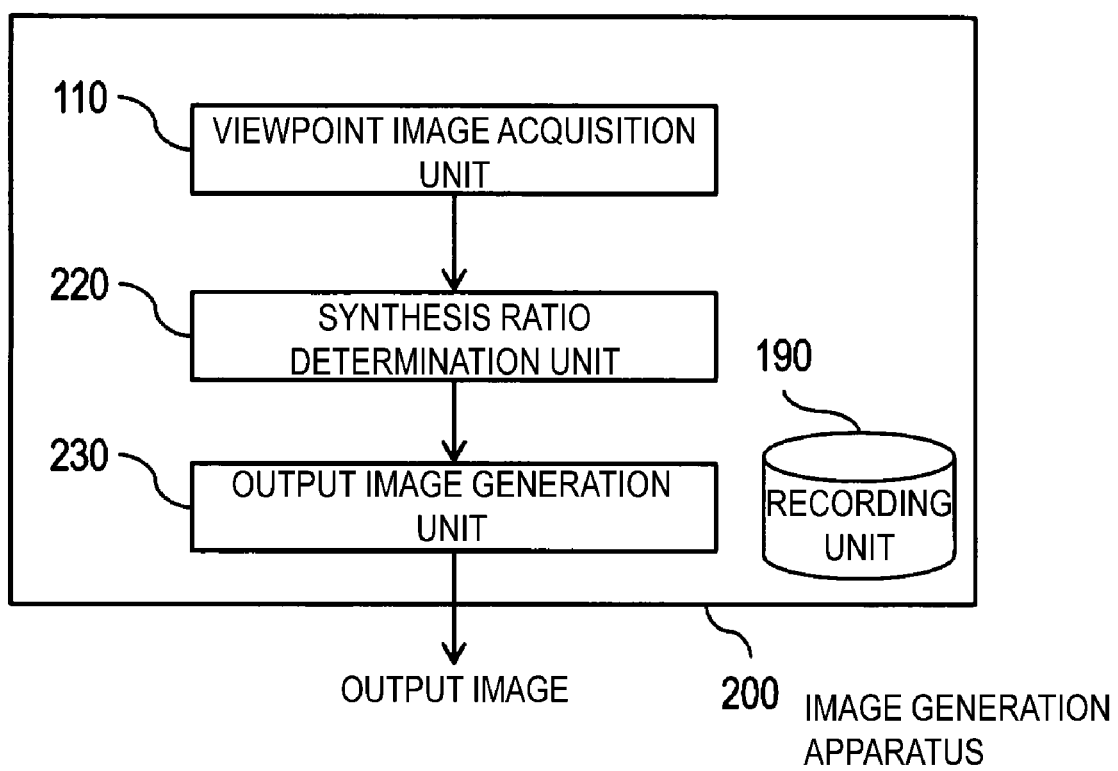
FIG. 7 is a block diagram illustrating a configuration of an image generation apparatus 200.
Figure 8:
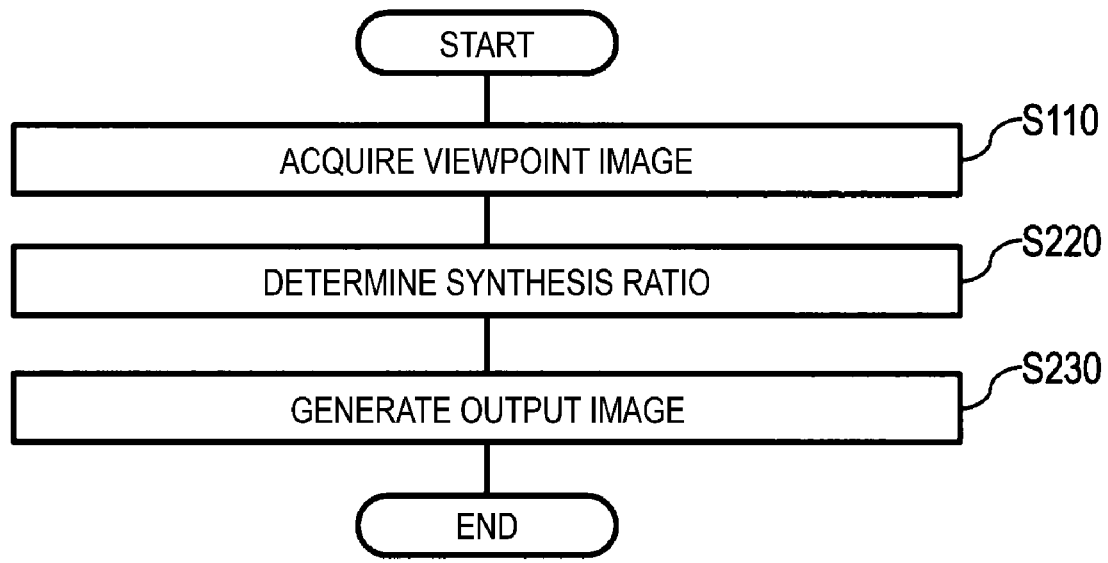
FIG. 8 is a flowchart illustrating an operation of the image generation apparatus 200.

Hereinafter, an image generation apparatus 200 will be described with reference to FIGS. 7 and 8. FIG. 7 is a block diagram illustrating a configuration of the image generation apparatus 200. FIG. 8 is a flowchart illustrating an operation of the image generation apparatus 200. As illustrated in FIG. 7, the image generation apparatus 200 includes a viewpoint image acquisition unit 110, a synthesis ratio determination unit 220, an output image generation unit 230, and a recording unit 190. The recording unit 190 is a component configured to appropriately record information required for processing of the image generation apparatus 200.

The operation of the image generation apparatus 200 will be described in accordance with FIG. 8. In step S110, the viewpoint image acquisition unit 110 acquires and outputs K observation viewpoint images $I_{2k-1}$ ($1 \leq k \leq K$) and K−1 intermediate viewpoint images $I_{2k}$ ($1 \leq k \leq K-1$).

Figure 9:
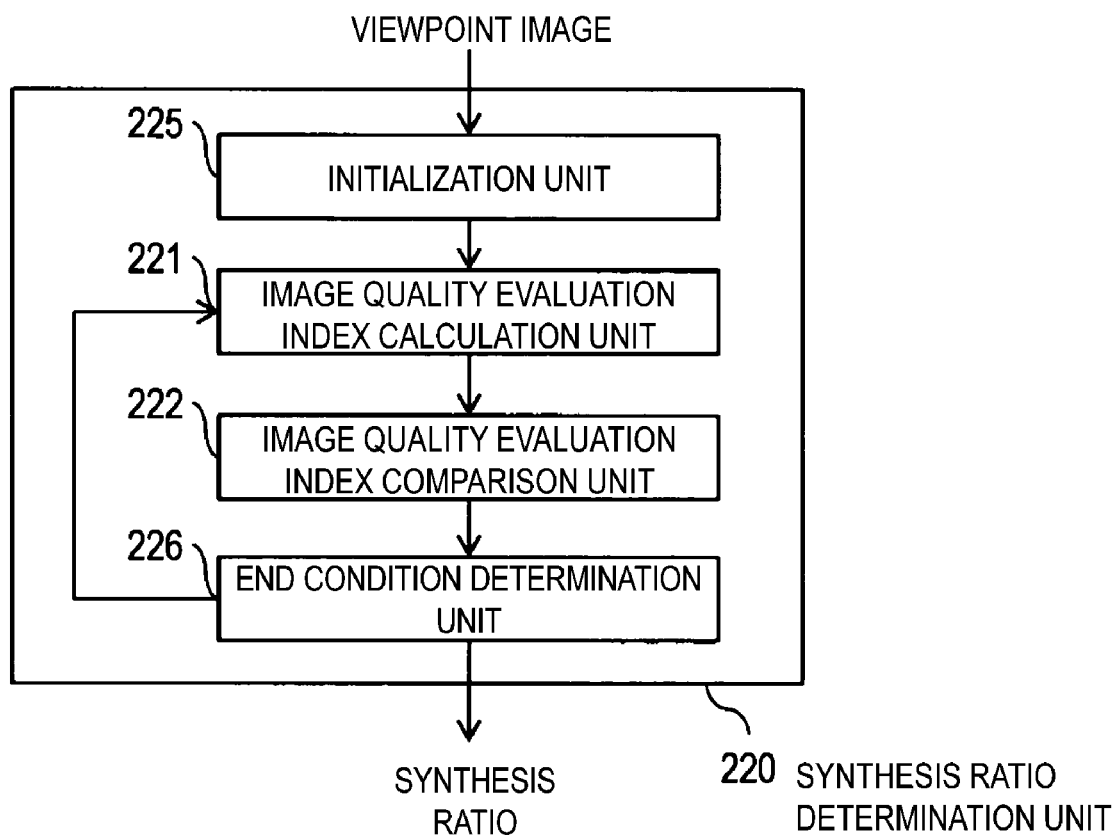
FIG. 9 is a block diagram illustrating a configuration of a synthesis ratio determination unit 220.
Figure 10:
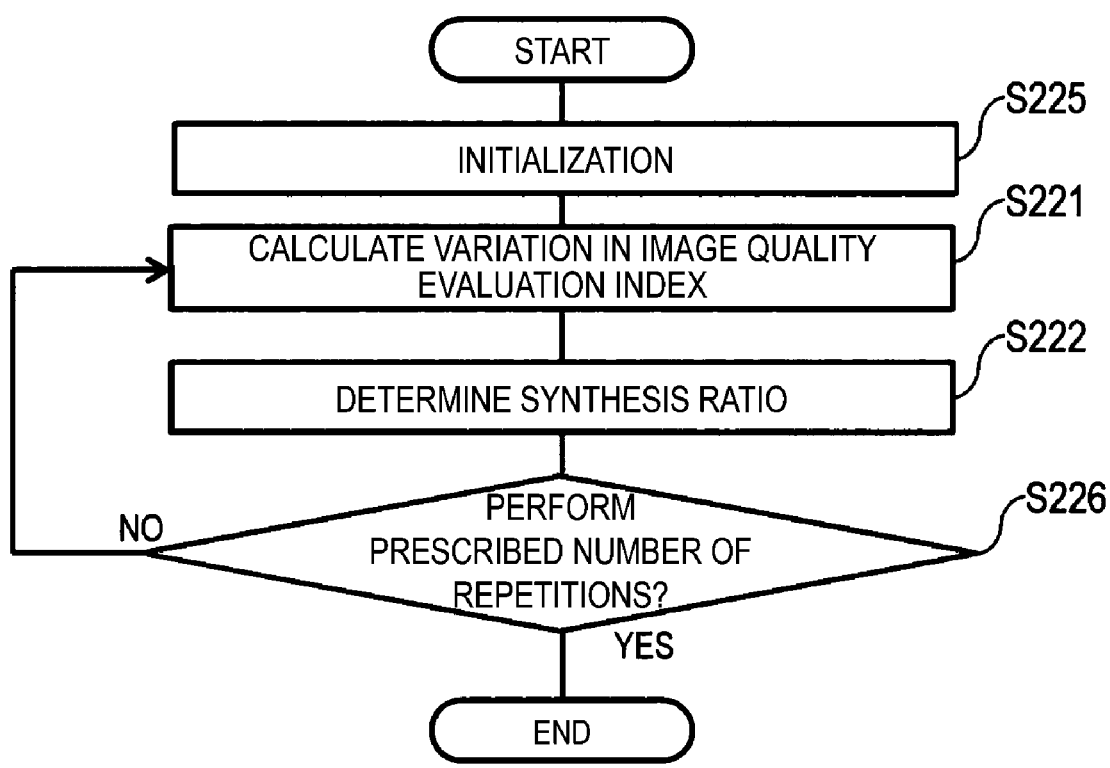
FIG. 10 is a flowchart illustrating an operation of the synthesis ratio determination unit 220.

In step S220, the synthesis ratio determination unit 220 uses K observation viewpoint images $I_{2k-1}$ ($1 \leq k \leq K$) and K−1 intermediate viewpoint images $I_{2k}$ ($1 \leq k \leq K-1$) acquired at S110 as inputs, determines the synthesis ratio $A_k$ in the block $B_k$ by using the intermediate viewpoint image $I_{2k-2}$, the observation viewpoint image the intermediate viewpoint image $I_{2k}$, the observation viewpoint image $I_{2k+1}$, and the intermediate viewpoint image $I_{2k+2}$, for the block $B_k$ ($1 \leq k \leq K-1$), and outputs K−1 synthesis ratios $A_k$ ($1 \leq k \leq K-1$) (where $I_0 = I_2$, $I_{2K} = I_{2K-2}$). Here, the synthesis ratio $A_k$ is used when the output image generation unit 230 generates the output image. Hereinafter, the synthesis ratio determination unit 220 will be described with reference to FIGS. 9 to 10. FIG. 9 is a block diagram illustrating a configuration of the synthesis ratio determination unit 220. FIG. 10 is a flowchart illustrating an operation of the synthesis ratio determination unit 220. As illustrated in FIG. 9, the synthesis ratio determination unit 220 includes an initialization unit 225, an image quality evaluation index calculation unit 221, an image quality evaluation index comparison unit 222, and an end condition determination unit 226.

An operation of the synthesis ratio determination unit 220 will be described with reference to FIG. 10. In step S225, the initialization unit 225 sets the value of k, which is a parameter representing the number of repetitions, to 1.

Figure 11:
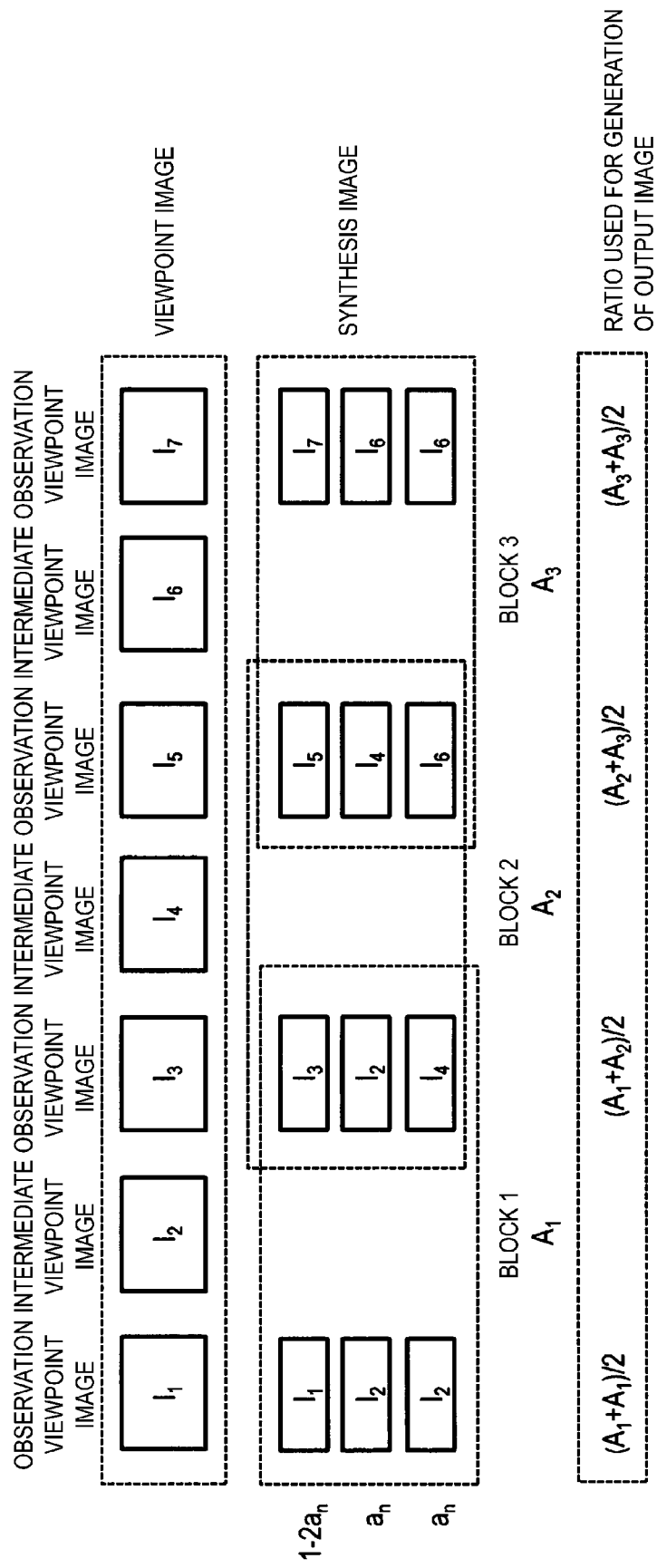
FIG. 11 is a diagram illustrating a state of processing performed by the synthesis ratio determination unit 220 and the output image generation unit 230 (k=4).

In step S221, the image quality evaluation index calculation unit 221 generates the synthesis image $J_{2k-1}$ from the intermediate viewpoint image $I_{2k-2}$, the observation viewpoint image $I_{2k-1}$, and the intermediate viewpoint image $I_{2k}$, and the synthesis image $J_{2k+1}$ from the intermediate viewpoint image $I_{2k}$, the observation viewpoint image $I_{2k+1}$, and the intermediate viewpoint image $I_{2k+2}$, for N (where N is an integer of 1 or greater) synthesis ratios $a_n$ ($0 \leq a_n \leq 1$, $1 \leq n \leq N$, n is a parameter representing an integer), uses the synthesis images $J_{2k-1}$ and $J_{2k+1}$ to calculate the image quality evaluation index in the observation viewpoint $V_{2k-1}$, the image quality evaluation index in the intermediate viewpoint $V_{2k}$, and the image quality evaluation index in the observation viewpoint $V_{2k+1}$, and uses the image quality evaluation index in the observation viewpoint $V_{2k-1}$, the image quality evaluation index in the intermediate viewpoint $V_{2k}$, and the image quality evaluation index in the observation viewpoint $V_{2k+1}$ to calculate the variation $v_k$ ($a_n$) of the image quality evaluation index in the block $B_k$. Detailed description will be given below (see FIG. 11). The synthesis image $J_{2k-1}$ at the observation viewpoint position $V_{2k-1}$ is generated as $(1-2a_n) \times I_{2k-1} + a_n \times I_{2k-2} + a_n \times I_{2k}$. Similarly, the synthesis image $J_{2k+1}$ at the observation point position $V_{2k+1}$ is generated as $(1-2a_n) \times I_{2k+1} + a_n \times I_{2k} + a_n \times I_{2k+2}$. Thus, the perceived image at the observation viewpoint position $V_{2k-1}$ and the perceived image at the observation viewpoint position $V_{2k+1}$ are the synthesis image $J_{2k-1}$ at the observation viewpoint position $V_{2k-1}$ and the synthesis image $J_{2k+1}$ at the observation viewpoint position $V_{2k+1}$. The perceived image at the intermediate viewpoint position $V_{2k}$ is the average of the synthesis image $J_{2k-1}$ at the observation viewpoint position $V_{2k-1}$ and the synthesis image $J_{2k+1}$ at the observation viewpoint position $V_{2k+1}$ (that is, $\frac{1}{2} \times (J_{2k-1} + J_{2k+1})$). Then, the image quality evaluation index Ind ($V_{2k-1}$, $a_n$) of the perceived image at the observation viewpoint position $V_{2k-1}$ with respect to the synthesis ratio $a_n$, the image quality evaluation index Ind ($V_{2k}$, $a_n$) of the perceived image at the intermediate viewpoint position $V_{2k}$ with respect to the synthesis ratio $a_n$, and the image quality evaluation index Ind ($V_{2k+1}$, $a_n$) of the perceived image at the observation viewpoint position $V_{2k+1}$ with respect to the synthesis ratio $a_n$ are calculated, and the absolute value of the difference with respect to the synthesis ratio $a_n$, $D_k(a_n) = |Ind(V_{2k}, a_n) - \frac{1}{2} \times (Ind(_{2k-1}, a_n) + Ind(V_{2k+1}, a_n))|$ is calculated as the variation $v_k$ ($a_n$) of the image quality evaluation index. Note that the absolute value $D_k$ ($a_n$) of the difference used in the calculation of the variation $v_k$ ($a_n$) of the image quality evaluation index is merely an example, and other methods may be used.

In step S222, the image quality evaluation index comparison unit 222 determines a synthesis ratio $a_n$ that minimizes the variation $v_k$ ($a_n$) ($1 \leq n \leq N$) of the image quality evaluation index in the block $B_k$ as the synthesis ratio A.

Note that it is an example to determine the synthesis ratio $A_k$ as the synthesis ratio $a_n$ where the variation $v_k$ ($a_n$) ($1 \leq n \leq N$) in the image quality evaluation index is minimized, and any determination method may be used as long as the image quality evaluation index comparison unit 222 determines the synthesis ratio $A_k$ based on the variation $v_k$ ($a_n$) ($1 \leq n \leq N$) of the image quality evaluation index in the block $B_k$. For example, one of variations $v_k$ ($a_n$) of the image quality evaluation index smaller than a predetermined threshold value may be determined as the synthesis ratio $A_k$, by using the predetermined threshold value (such as an acceptable value as a valuation in the image quality evaluation index defined by an image quality evaluation experiment or the like). Note that in a case where there is no variation $v_k$ ($a_n$) in the image quality evaluation index that is smaller than the threshold value, the synthesis ratio $a_n$ where the variation $v_k$ ($a_n$) ($1 \leq n \leq N$) in the image quality evaluation index is minimized may be determined as the synthesis ratio $A_k$.

In step S226, the end condition determination unit 226 increments k by 1, in a case where k reaches K (i.e., k>K−1), outputs K−1 synthesis ratios $A_k$ ($1 \leq k \leq K-1$), and transitions to the processing of S230, or otherwise the process returns to the processing of S221.

In step S230, the output image generation unit 230 uses the K observation viewpoint images $I_{2k-1}$ ($1 \leq k \leq K$) and the K−1 intermediate viewpoint images $I_{2k}$ ($1 \leq k \leq K-1$) acquired at S110 and the K−1 synthesis ratios $A_k$ ($1 \leq k \leq K-1$) determined at S220 as inputs to generate the output images $S_{2k-1}$ of the projector $P_{2k-1}$ from the intermediate viewpoint images $I_{2k-2}$, the observation viewpoint images $I_{2k-1}$, and the intermediate viewpoint images $I_{2k}$ by using the synthesis ratios $A_{k-1}$, $A_k$ for k satisfying $1 \leq k \leq K$, and outputs K output images $S_{2k-1}$ ($1 \leq k \leq K$) (where $A_0 = A_1$, $A_K = A_{K-1}$, $I_0 = I_2$, $I_{2K} = I_{2K-2}$). Here, the output images $S_{2k-1}$ at the observation viewpoint position $V_{2k-1}$ is generated as $(1 - (A_{k-1} + A_k)) \times I_{2k-1} + \frac{1}{2} \times (A_{k-1} + A_k) \times I_{2k-2} + \frac{1}{2} \times (A_{k-1} + A_k) \times I_{2k}$ (see FIG. 11).

Note that in S220 and S230, $I_0 = I_2$ and the intermediate viewpoint image $I_2$ next to the observation viewpoint image $I_1$ are used, but instead of using the intermediate viewpoint image $I_2$, the observation viewpoint image $I_1$ may be used. That is, $I_0 = I_1$ may be used. Note that in S220 and S230, $I_{2K} = I_{2K-2}$ and the intermediate viewpoint image $I_{2K-2}$ next to the observation viewpoint image $I_{2K-1}$ are used, but instead of using the intermediate viewpoint image $I_{2K-2}$, the observation viewpoint image $I_{2K-1}$ may be used. That is, $I_{2K} = I_{2K-1}$ may be used.

Modified Example

In the above description, the N synthesis ratios $a_n$ used in the generation of the synthesis images $J_{2k-1}$ and $J_{2k+1}$ have been described as being the same, but they are not necessary to be the same in the same manner as in the first embodiment. In this case, K−1 synthesis ratios (set) $A_k$ ($1 \leq k \leq K-1$) is used.

According to the invention of the present embodiment, it is possible to suppress unpleasantness associated with fluctuation in image quality caused by the viewer's viewpoint movement.

Third Embodiment

The image generation apparatus 300 generates an image (hereinafter referred to as an output image) that is output by K projectors (K is an integer of 3 or greater). These K projectors are referred to as $P_1$, $P_3$, . . . , $P_{2K-1}$. The projectors $P_1$, $P_3$, . . . , $P_{2K-1}$ are installed aligned in a circular alignment. For example, the projectors $P_1$, $P_3, \ldots, P_{2K-1}$ may be installed on a circle, and each projector may be a projector that projects an image onto a circular screen. For example, K=60 may be used. The present embodiment is not limited to K=60, but generally the smaller the K (i.e., the smaller the number of projectors), the worse the image quality of the perceived image at the intermediate viewpoint position. The circle may not be exactly circular, but for example it may be a predetermined closed curve.

The viewpoint corresponding to the installation position of the projector $P_{2k-1}$ is referred to as an observation viewpoint $V_{2k-1}$ (1≤k≤K), the viewpoint corresponding to the intermediate position of the installation positions of the two adjacent projectors $P_{2K-1}$ and $P_{2k+1}$ (where $P_{2K+1}=P_1$) is referred to as an intermediate viewpoint $V_{2k}$ (1≤k≤K), the image corresponding to the observation viewpoint $V_{2k-1}$ is referred to as an observation viewpoint image $I_{2k-1}$ (1≤k≤K), and the image in the intermediate viewpoint $V_{2k}$ is referred to as an intermediate viewpoint image $I_{2k}$ (1≤k≤K). Here, k is a parameter representing an integer.

The set of the observation viewpoint image the intermediate viewpoint image $I_{2k}$, and the observation viewpoint image $I_{2k+1}$ are referred to as a block $B_k$ (1≤k≤K) (where $I_{2K+1}=I_1$).

Figure 12:
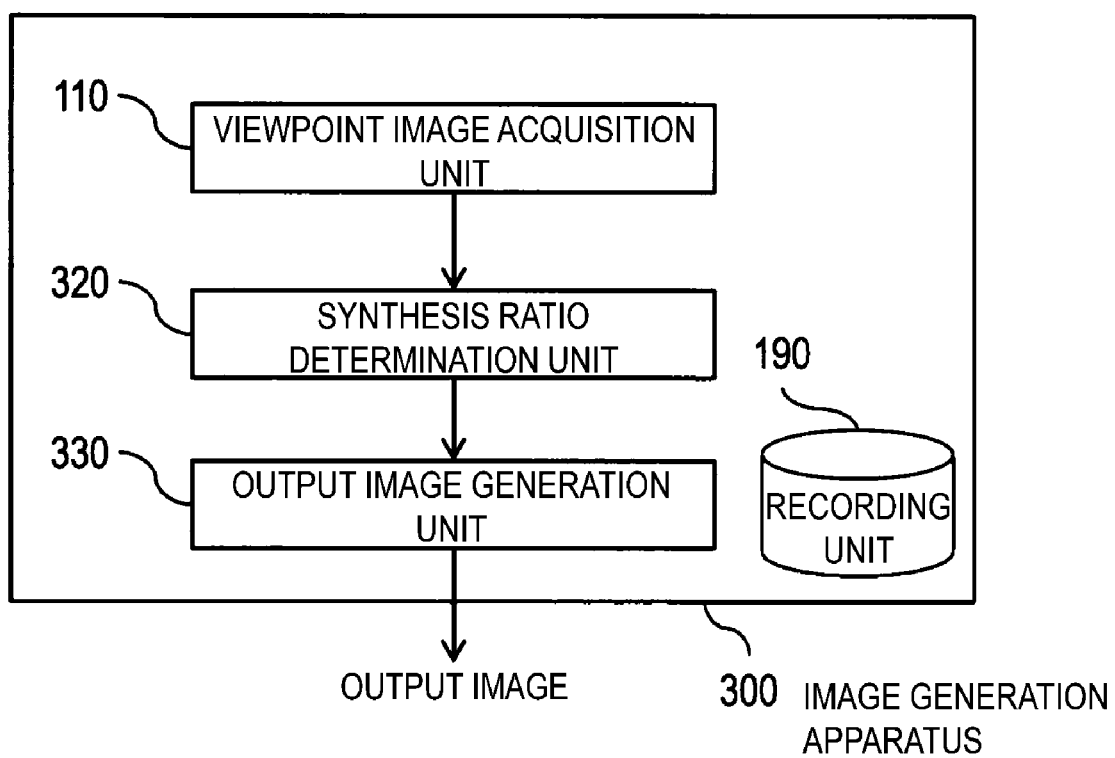
FIG. 12 is a block diagram illustrating a configuration of an image generation apparatus 300.
Figure 13:
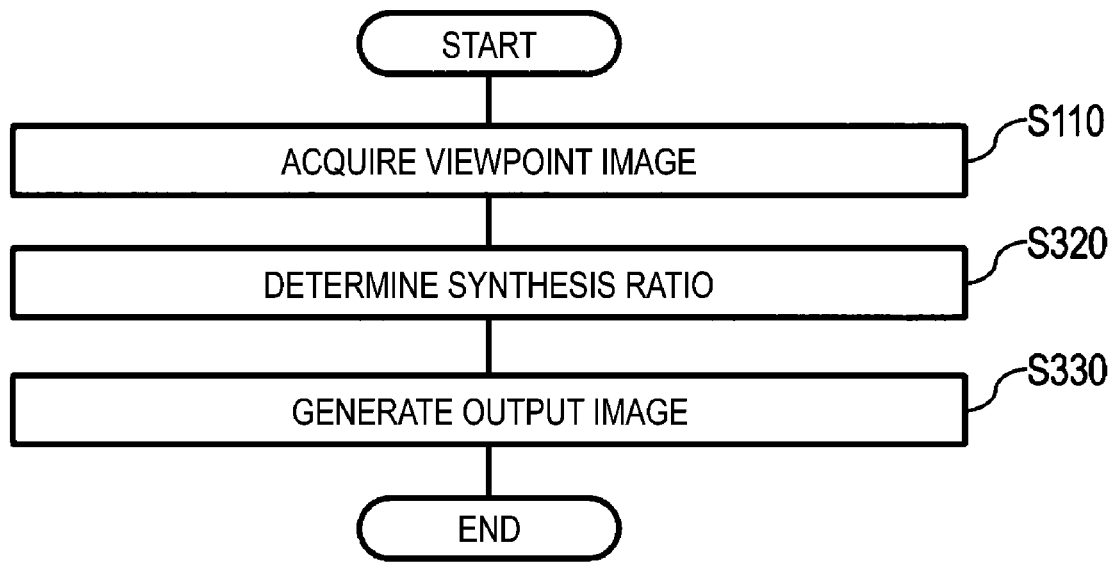
FIG. 13 is a flowchart illustrating an operation of the image generation apparatus 300.

Hereinafter, an image generation apparatus 300 will be described with reference to FIGS. 12 and 13. FIG. 12 is a block diagram illustrating a configuration of the image generation apparatus 300. FIG. 13 is a flowchart illustrating an operation of the image generation apparatus 300. As illustrated in FIG. 12, the image generation apparatus 300 includes a viewpoint image acquisition unit 110, a synthesis ratio determination unit 320, an output image generation unit 330, and a recording unit 190. The recording unit 190 is a component configured to appropriately record information required for processing of the image generation apparatus 300.

The operation of the image generation apparatus 300 will be described in accordance with FIG. 13. In step S110, the viewpoint image acquisition unit 110 acquires and outputs K observation viewpoint images $I_{2k-1}$ (1≤k≤K) and K intermediate viewpoint images $I_{2k}$ (1≤k≤K).

Figure 14:
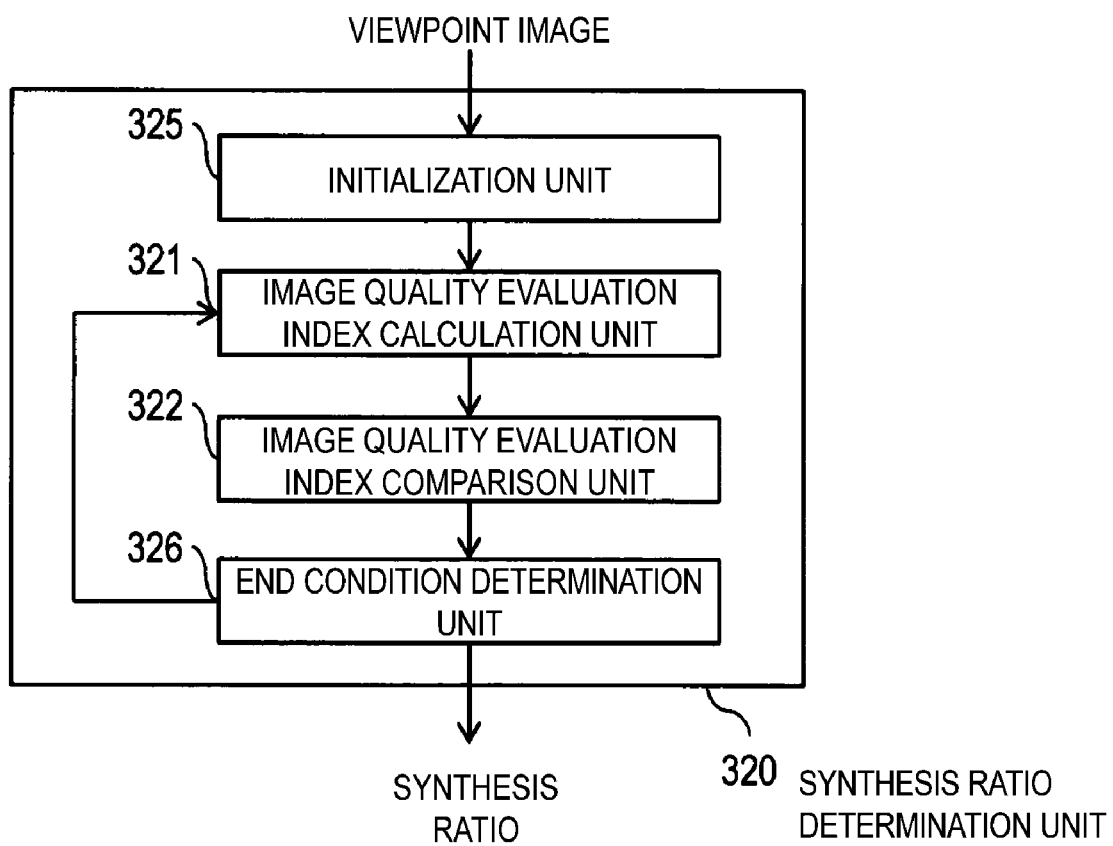
FIG. 14 is a block diagram illustrating a configuration of a synthesis ratio determination unit 320.
Figure 15:
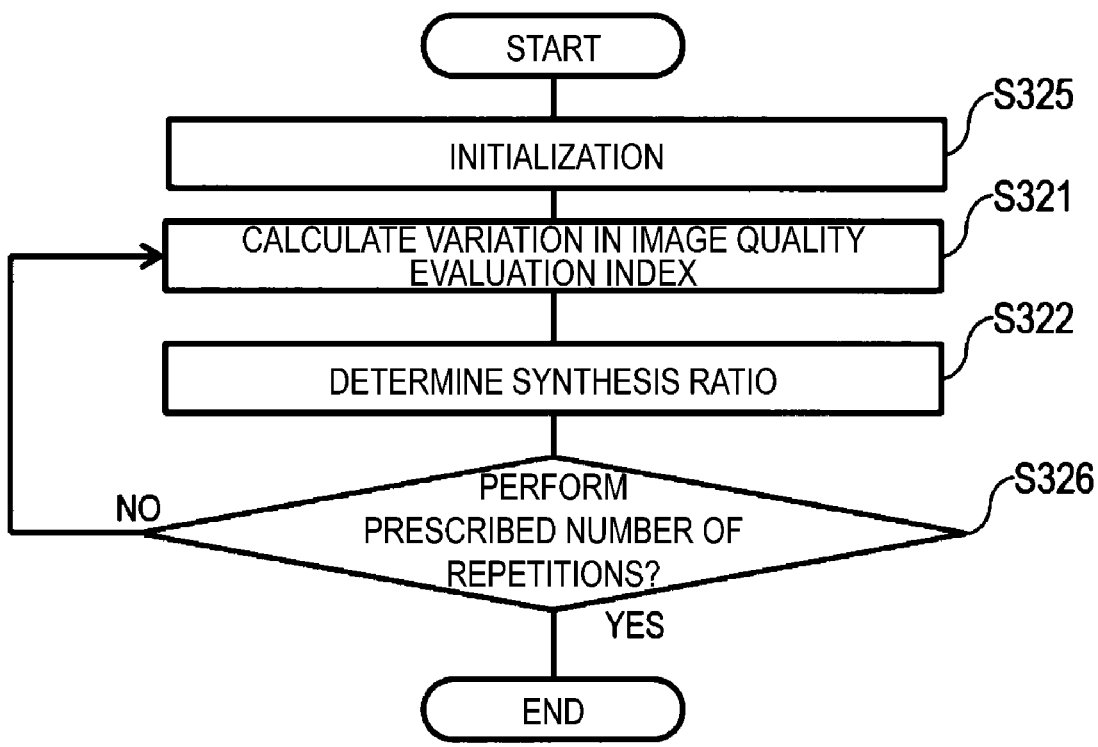
FIG. 15 is a flowchart illustrating an operation of the synthesis ratio determination unit 320.

In step S320, the synthesis ratio determination unit 320 uses K observation viewpoint images $I_{2k-1}$ (1≤k≤K) and K intermediate viewpoint images $I_{2k}$ (1≤k≤K) acquired at S110 as inputs, determines the synthesis ratio $A_k$ in the block $B_k$ by using the intermediate viewpoint image $I_{2k-2}$, the observation viewpoint image $I_{2k-1}$, the intermediate viewpoint image $I_{2k}$, the observation viewpoint image $I_{2k+1}$, and the intermediate viewpoint image $I_{2k+2}$, for the block $B_k$ (1≤k≤K), and outputs K synthesis ratios $A_k$ (1≤k≤K) (where $I_0=I_{2K}$, $I_{2K+1}=I_1$, $I_{2K+2}=I_2$). Here, the synthesis ratio $A_k$ is used when the output image generation unit 330 generates the output image. Hereinafter, the synthesis ratio determination unit 320 will be described with reference to FIGS. 14 to 15. FIG. 14 is a block diagram illustrating a configuration of the synthesis ratio determination unit 320. FIG. 15 is a flowchart illustrating an operation of the synthesis ratio determination unit 320. As illustrated in FIG. 14, the synthesis ratio determination unit 320 includes an initialization unit 325, an image quality evaluation index calculation unit 321, an image quality evaluation index comparison unit 322, and an end condition determination unit 326.

An operation of the synthesis ratio determination unit 320 will be described with reference to FIG. 15. In step S325, the initialization unit 325 sets the value of k, which is a parameter representing the number of repetitions, to 1.

In step S321, the image quality evaluation index calculation unit 321 generates the synthesis image $J_{2k-1}$ from the intermediate viewpoint image $I_{2k-2}$, the observation viewpoint image $I_{2k-1}$, and the intermediate viewpoint image $I_{2k}$, and the synthesis image $J_{2k+1}$ from the intermediate viewpoint image $I_{2k}$, the observation viewpoint image $I_{2k+1}$, and the intermediate viewpoint image $I_{2k+2}$, for N (where N is an integer of 1 or greater) synthesis ratios $a_n$ (0≤$a_n$≤1, 1≤n≤N, n is a parameter representing an integer), uses the synthesis images $J_{2k-1}$ and $J_{2k+1}$ to calculate the image quality evaluation index in the observation viewpoint $V_{2k-1}$, the image quality evaluation index in the intermediate viewpoint $V_{2k}$, and the image quality evaluation index in the observation viewpoint $V_{2k+1}$, and uses the image quality evaluation index in the observation viewpoint $V_{2k-1}$, the image quality evaluation index in the intermediate viewpoint $V_{2k}$, and the image quality evaluation index in the observation viewpoint $V_{2k+1}$ to calculate the variation $v_k(a_n)$ of the image quality evaluation index in the block $B_k$ (where, $J_{2K+1}=J_1$, $V_{2K+1}=V_1$). The specific calculation method may be the same as that of the image quality evaluation index calculation unit 221.

Figure 16:
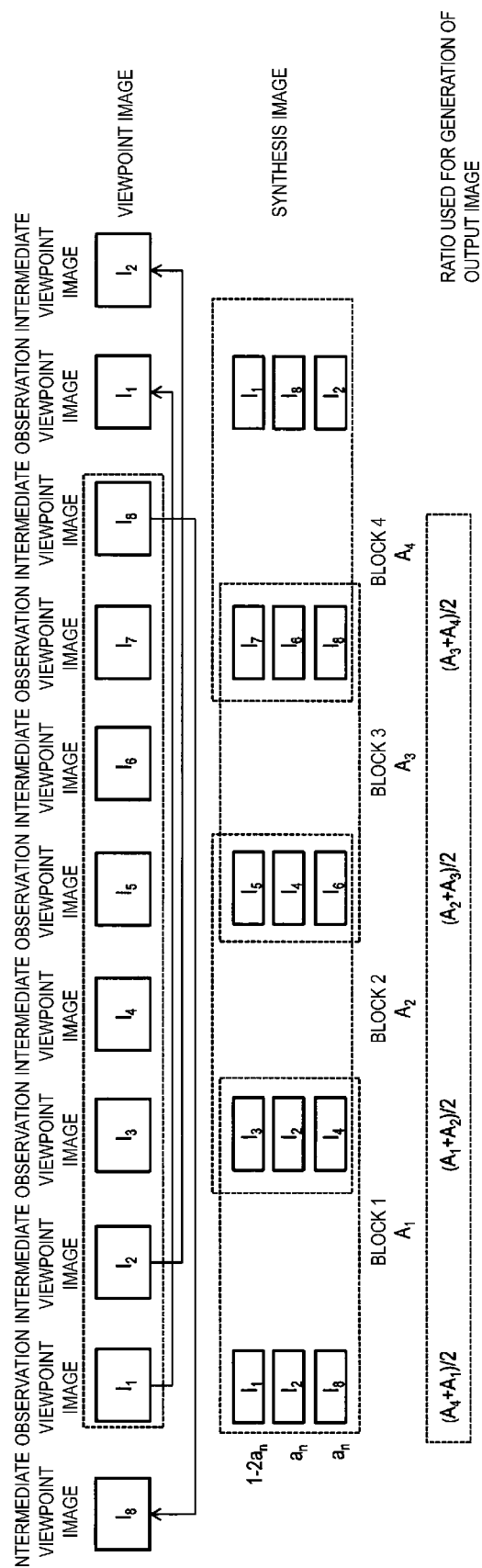
FIG. 16 is a diagram illustrating a state of processing performed by the synthesis ratio determination unit 320 an output image generation unit 330 (k=4).

In step S322, the image quality evaluation index comparison unit 322 determines a synthesis ratio $a_n$ that minimizes the variation $v_k(a_n)$ (1≤n≤N) of the image quality evaluation index in the block $B_k$ as the synthesis ratio A (see FIG. 16). Note that it is an example to determine the synthesis ratio $A_k$ as the synthesis ratio $a_n$ where the variation $v_k(a_n)$ (1≤n≤N) in the image quality evaluation index is minimized, and any determination method may be used as long as the image quality evaluation index comparison unit 322 determines the synthesis ratio $A_k$ based on the variation $v_k(a_n)$ (1≤n≤N) of the image quality evaluation index in the block $B_k$. For example, one of variations $v_k(a_n)$ of the image quality evaluation index smaller than a predetermined threshold value may be determined as the synthesis ratio $A_k$, by using the predetermined threshold value (such as an acceptable value as a valuation in the image quality evaluation index defined by an image quality evaluation experiment or the like). Note that in a case where there is no variation $v_k(a_n)$ in the image quality evaluation index that is smaller than the threshold value, the synthesis ratio $a_n$ where the variation $v_k(a_n)$ (1≤n≤N) in the image quality evaluation index is minimized may be determined as the synthesis ratio $A_k$.

In step S326, the end condition determination unit 326 increments k by 1, in a case where k exceeds K (i.e., k>K), outputs K synthesis ratios $A_k$ (1≤k≤K), and transitions to the processing of S330, or otherwise the process returns to the processing of S321.

In step S330, the output image generation unit 330 uses the K observation viewpoint images $I_{2k-1}$ (1≤k≤K) and the K intermediate viewpoint images $I_{2k}$ (1≤k≤K) acquired at S110 and the K synthesis ratios $A_k$ (1≤k≤K) determined at S320 as inputs to generate the output images $S_{2k-1}$ of the projector $P_{2k-1}$ from the intermediate viewpoint images $I_{2k-2}$, the observation viewpoint images $I_{2k-1}$, and the intermediate viewpoint images $I_{2k}$ by using the synthesis ratios $A_{k-1}$, $A_k$ for k satisfying 1≤k≤K, and outputs K output images $S_{2k-1}$ (1≤k≤K) (where $A_0=A_K$, $I_0=I_{2K}$). Here, the output images $S_{2k-1}$ at the observation viewpoint position $V_{2k-1}$ is generated as $(1-(A_{k-1}+A_k))\times I_{2k-1}+\frac{1}{2}\times(A_{k-1}+A_k)\times I_{2k-2}+\frac{1}{2}\times(A_{k-1}+A_k)\times I_{2k}$ (see FIG. 16).

Modified Example

In the above description, the N synthesis ratios $a_n$ used in the generation of the synthesis images $J_{2k-1}$ and $J_{2k+1}$ have been described as being the same, but they are not necessary to be the same in the same manner as in the first embodiment. In this case, K−1 synthesis ratios (set) $A_k$ (1≤k≤K−1) is used.

According to the invention of the present embodiment, it is possible to suppress unpleasantness associated with fluctuation in image quality caused by the viewer's viewpoint movement.

Fourth Embodiment

In the image generation apparatus 200, the intermediate viewpoint image is used to generate the output image. Instead of using the intermediate viewpoint image, an output image is generated by using an image (hereinafter referred to as a pseudo viewpoint image) in a pseudo viewpoint corresponding to the intermediate viewpoint generated by using the Hidden Stereo technique described in Reference NPL 1. Here, the pseudo viewpoint image refers to an image generated by adding a parallax inducing edge to the viewpoint image, or an image generated by adding a positive/negative reverse image of the parallax inducing edge to the viewpoint image. The parallax inducing edge is an image obtained by modulating a phase of the viewpoint image such that a phase difference from the viewpoint image becomes φ (0<φ≤π/2). Generating the output image by using the pseudo viewpoint image improves the image quality of the perceived image at the intermediate viewpoint because the parallax inducing edge is cancelled out in the intermediate viewpoint.

Reference NPL 1: M. Makiguchi, H. Takada, T. Fukiage, S. Nishida, "Reducing Image Quality Variation with Motion Parallax for Glassless 3D Screens Using Linear Blending Technology," SID, Vol. 49, Issue 1, pp. 251-254, 2018)

Figure 17:
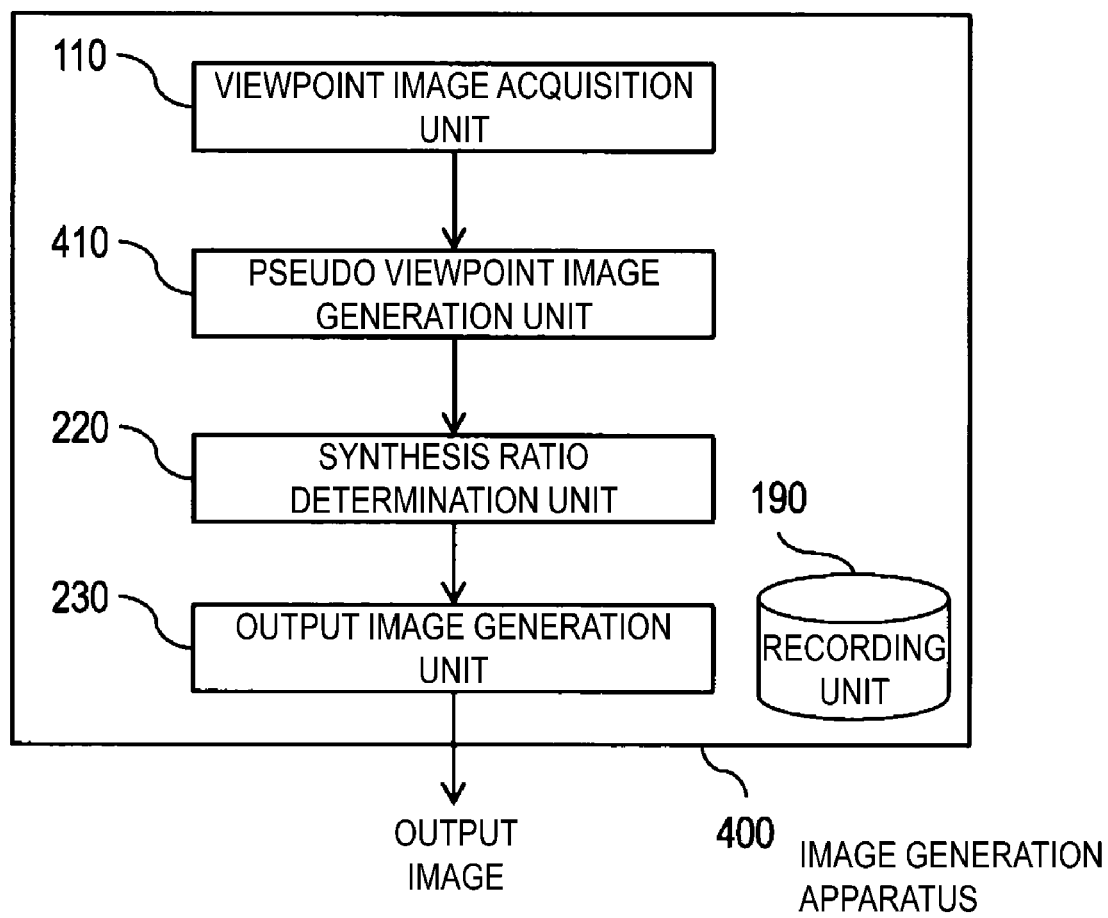
FIG. 17 is a block diagram illustrating a configuration of an image generation apparatus 400.
Figure 18:
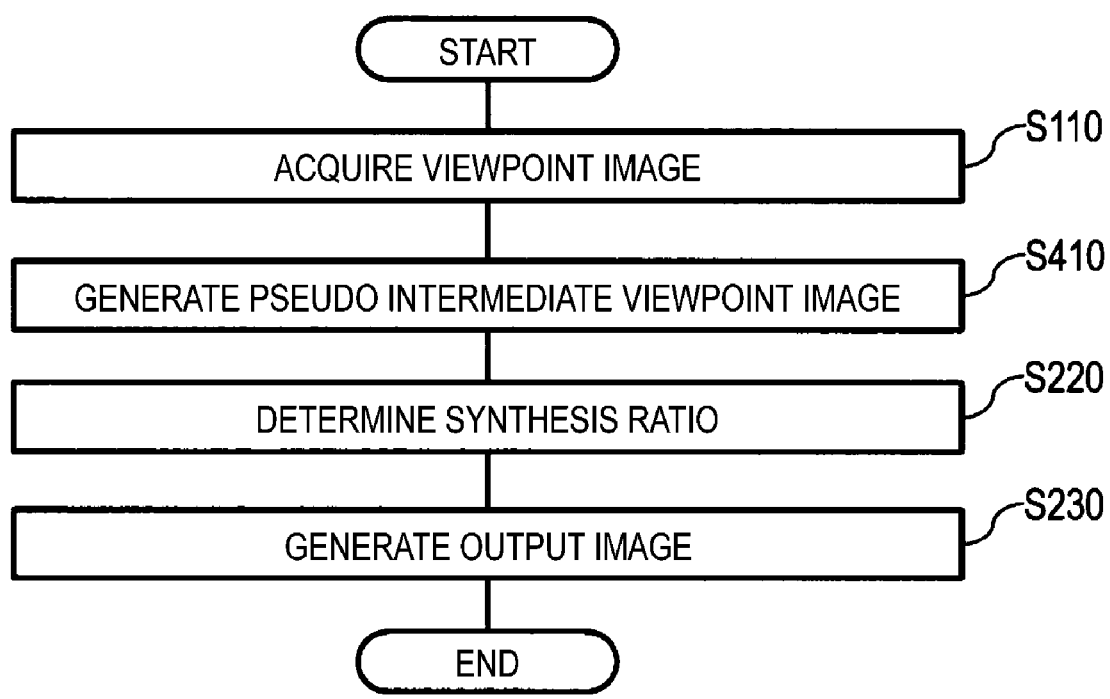
FIG. 18 is a flowchart illustrating an operation of the image generation apparatus 400.

Hereinafter, an image generation apparatus 400 will be described with reference to FIGS. 17 and 18. FIG. 17 is a block diagram illustrating a configuration of the image generation apparatus 400. FIG. 18 is a flowchart illustrating an operation of the image generation apparatus 400. As illustrated in FIG. 17, the image generation apparatus 400 includes a viewpoint image acquisition unit 110, a pseudo viewpoint image generation unit 410, a synthesis ratio determination unit 220, an output image generation unit 230, and a recording unit 190. The recording unit 190 is a component configured to appropriately record information required for processing of the image generation apparatus 400. The image generation apparatus 400 differs from the image generation apparatus 200 only in that the image generation apparatus 400 further includes a pseudo viewpoint image generation unit 410.

The operation of the image generation apparatus 400 will be described in accordance with FIG. 18. In step S110, the viewpoint image acquisition unit 110 acquires and outputs K observation viewpoint images $I_{2k-1}$ (1≤k≤K) and K−1 intermediate viewpoint images $I_{2k}$ (1≤k≤K−1).

In step S410, the pseudo viewpoint image generation unit 410 uses K−1 intermediate viewpoint images $I_{2k}$ (1≤k≤K−1) acquired at S110 as inputs to generate a parallax inducing edge $D_φ$ having a phase difference from the intermediate viewpoint images $I_{2k}$ being φ (φ is a real number satisfying 0<φ≤π/2) by using the intermediate viewpoint images $I_{2k}$ and the observation viewpoint images $I_{2k+1}$ for the intermediate viewpoint images $I_{2k}$ (1≤k≤K−1), generates the pseudo intermediate viewpoint image $I_{2k}^{(R)}$ by adding the parallax inducing edge $D_φ$ to the intermediate viewpoint images $I_{2k}$, generates the pseudo intermediate viewpoint image $I_{2k}^{(L)}$ by adding the positive/negative reverse image of the parallax inducing edge $D_φ$ to the intermediate viewpoint image $I_{2k}$, and outputs 2K−2 pseudo intermediate viewpoint images $I_{2k}^{(R)}$, $I_{2k}^{(L)}$ (1≤k≤K−1).

In step S220, the synthesis ratio determination unit 220 uses K observation viewpoint images $I_{2k-1}$ (1≤k≤K) acquired at S110 and 2K−2 pseudo intermediate viewpoint images $I_{2k}^{(R)}$, $I_{2k}^{(L)}$ (1≤k≤K−1) generated at S410 as inputs, determines the synthesis ratio $A_k$ in the block $B_k$ by using the pseudo intermediate viewpoint image $I_{2k-2}^{(R)}$, the observation viewpoint image $I_{2k-1}$, the pseudo intermediate viewpoint image $I_{2k}^{(L)}$, the pseudo intermediate viewpoint image $I_{2k}^{(R)}$, the observation viewpoint image $I_{2k+1}$, and the pseudo intermediate viewpoint image $I_{2k+2}^{(L)}$, for the block $B_k$ (1≤k≤K−1), and outputs K−1 synthesis ratios $A_k$ (1≤k≤K−1) (where $I_0^{(R)}=I_2^{(R)}$, $I_{2K}^{(L)}=I_{2K+2}^{(L)}$). Here, the synthesis ratio $A_k$ is used when the output image generation unit 230 generates the output image. Hereinafter, the synthesis ratio determination unit 220 will be described with reference to FIGS. 9 to 10. FIG. 9 is a block diagram illustrating a configuration of the synthesis ratio determination unit 220. FIG. 10 is a flowchart illustrating an operation of the synthesis ratio determination unit 220. As illustrated in FIG. 9, the synthesis ratio determination unit 220 includes an initialization unit 225, an image quality evaluation index calculation unit 221, an image quality evaluation index comparison unit 222, and an end condition determination unit 226.

An operation of the synthesis ratio determination unit 220 will be described with reference to FIG. 10. In step S225, the initialization unit 225 sets the value of k, which is a parameter representing the number of repetitions, to 1.

In step S221, the image quality evaluation index calculation unit 221 generates the synthesis image $J_{2k-1}$ from the pseudo intermediate viewpoint image $I_{2k-2}^{(R)}$, the observation viewpoint image $I_{2k-1}$, and the pseudo intermediate viewpoint image $I_{2k}^{(L)}$, and the synthesis image $J_{2k+1}$ from the pseudo intermediate viewpoint image $I_{2k}^{(R)}$, the observation viewpoint image $I_{2k+1}$, and the pseudo intermediate viewpoint image $I_{2k+2}^{(L)}$, for N (where N is an integer of 1 or greater) synthesis ratios $a_n$ (0≤$a_n$≤1, 1≤n≤N, n is a parameter representing an integer), uses the synthesis images $J_{2k-1}$ and $J_{2k+1}$ to calculate the image quality evaluation index in the observation viewpoint $V_{2k-1}$, the image quality evaluation index in the intermediate viewpoint $V_{2k}$, and the image quality evaluation index in the observation viewpoint $V_{2k+1}$, and uses the image quality evaluation index in the observation viewpoint $V_{2k-1}$, the image quality evaluation index in the intermediate viewpoint $V_{2k}$, and the image quality evaluation index in the observation viewpoint $V_{2k+1}$ to calculate the variation $v_k(a_n)$ of the image quality evaluation index in the block $B_k$.

In step S222, the image quality evaluation index comparison unit 222 determines a synthesis ratio $a_n$ that minimizes the variation $v_k(a_n)$ (1≤n≤N) of the image quality evaluation index in the block $B_k$ as the synthesis ratio $A_k$. Note that it is an example to determine the synthesis ratio $A_k$ as the synthesis ratio $a_n$ where the variation $v_k(a_n)$ (1≤n≤N) in the image quality evaluation index is minimized, and any determination method may be used as long as the image quality evaluation index comparison unit 222 determines the synthesis ratio $A_k$ based on the variation $v_k(a_n)$ (1≤n≤N) of the image quality evaluation index in the block $B_k$. For example, one of variations $v_k(a_n)$ of the image quality evaluation index smaller than a predetermined threshold value may be determined as the synthesis ratio $A_k$, by using the predetermined threshold value (such as an acceptable value as a valuation in the image quality evaluation index defined by an image quality evaluation experiment or the like). Note that in a case where there is no variation $v_k (a_n)$ in the image quality evaluation index that is smaller than the threshold value, the synthesis ratio $a_n$ where the variation $v_k (a_n)$ ($1 \leq n \leq N$) in the image quality evaluation index is minimized may be determined as the synthesis ratio $A_k$.

In step S226, the end condition determination unit 226 increments k by 1, in a case where k reaches K (i.e., k>K−1), outputs K−1 synthesis ratios $A_k$ ($1 \leq k \leq K-1$), and transitions to the processing of S230, or otherwise the process returns to the processing of S221.

In step S230, the output image generation unit 230 uses the K observation viewpoint images $I_{2k-1}$ ($1 \leq k \leq K$) acquired at S110 and the 2K−2 pseudo intermediate viewpoint images $I_{2k}^{(R)}$, $I_{2k}^{(L)}$ ($1 \leq k \leq K-1$) generated at S410 and the K−1 synthesis ratios $A_k$ ($1 \leq k \leq K-1$) determined at S220 as inputs to generate the output images $S_{2k-1}$ of the projector $P_{2k-1}$ from the pseudo intermediate viewpoint images $I_{2k-2}^{(R)}$, the observation viewpoint images $I_{2k-1}$, and the pseudo intermediate viewpoint images $I_{2k}^{(L)}$ by using the synthesis ratios $A_{k-1}$, $A_k$ for k satisfying $1 \leq k \leq K$, and outputs K output images $S_{2k-1}$ ($1 \leq k \leq K$) (where $A_0=A_1$, $A_K=A_{K-1}$, $I_0^{(R)}=I_2^{(R)}$, $I_{2K}^{(L)}=I_{2K-2}^{(L)}$).

Note that in S220 and S230, $I_0^{(R)}=I_2^{(R)}$ and the pseudo intermediate viewpoint image $I_2^{(R)}$ next to the observation viewpoint image $I_1$ are used, but instead of using the pseudo intermediate viewpoint image $I_2^{(R)}$, the observation viewpoint image $I_1$ may be used. That is, $I_0^{(R)}=I_1$ may be used. Note that in S220 and S230, $I_{2K}^{(L)}=I_{2K-2}^{(L)}$ and the pseudo intermediate viewpoint image $I_{2K-2}^{(L)}$ next to the observation viewpoint image $I_{2K-1}$ are used, but instead of using the pseudo intermediate viewpoint image $I_{2K-2}^{(L)}$, the observation viewpoint image $I_{2K-1}$ may be used. That is, $I_{2K}^{(L)}=I_{2K-1}$ may be used.

According to the invention of the present embodiment, it is possible to suppress unpleasantness associated with fluctuation in image quality caused by the viewer's viewpoint movement. Because the parallax inducing edge is canceled out in the intermediate viewpoint, the image quality of the perceived image at the intermediate viewpoint is improved.

Fifth Embodiment

In the image generation apparatus 300, similar to the image generation apparatus 200, the Hidden Stereo technique may be used.

Figure 19:
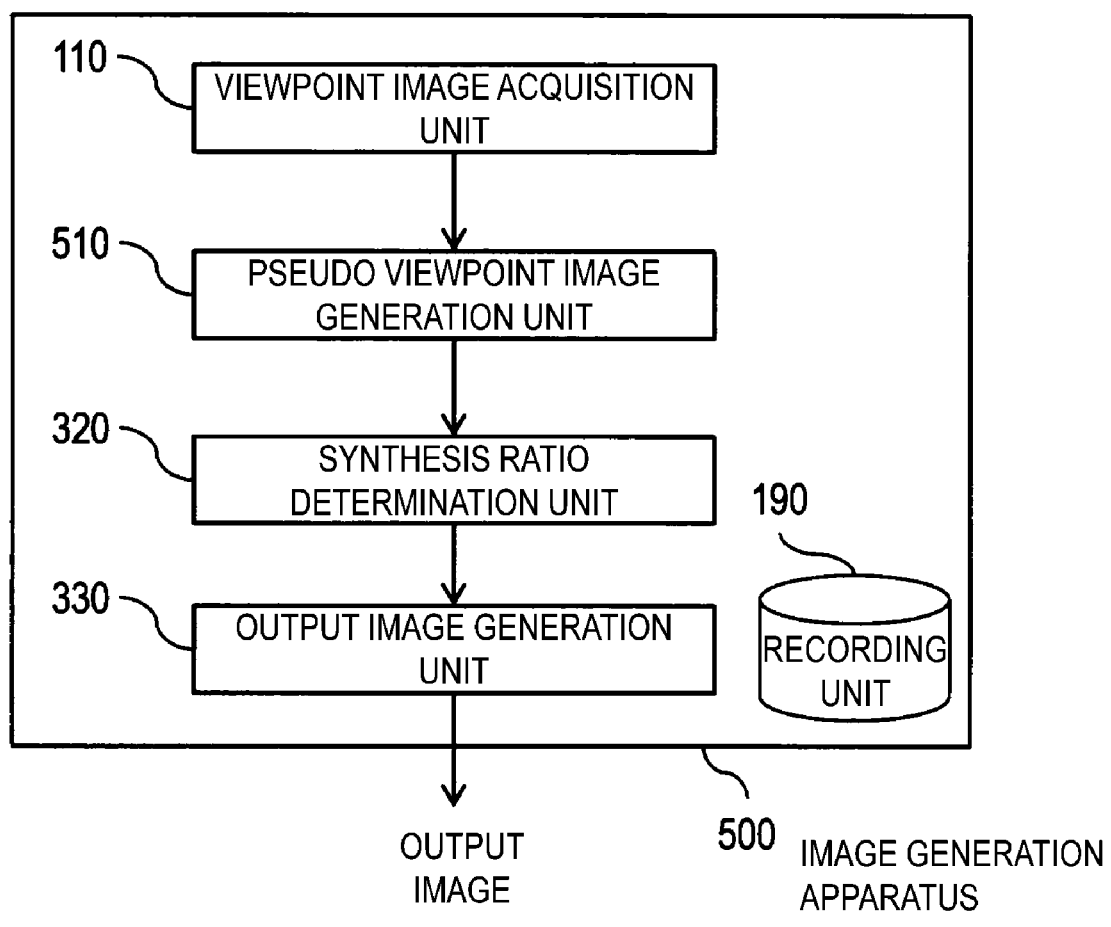
FIG. 19 is a block diagram illustrating a configuration of an image generation apparatus 500.
Figure 20:
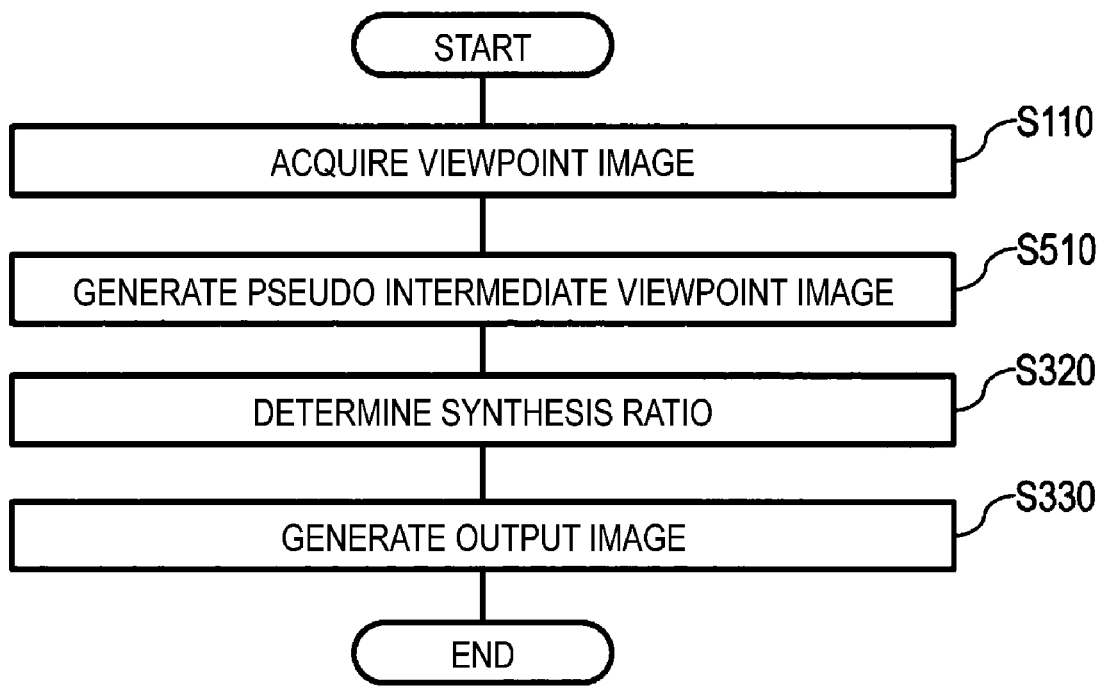
FIG. 20 is a flowchart illustrating an operation of the image generation apparatus 500.

Hereinafter, an image generation apparatus 500 will be described with reference to FIGS. 19 and 20. FIG. 19 is a block diagram illustrating a configuration of the image generation apparatus 500. FIG. 20 is a flowchart illustrating an operation of the image generation apparatus 500. As illustrated in FIG. 19, the image generation apparatus 500 includes a viewpoint image acquisition unit 110, a pseudo viewpoint image generation unit 510, a synthesis ratio determination unit 320, an output image generation unit 330, and a recording unit 190. The recording unit 190 is a component configured to appropriately record information required for processing of the image generation apparatus 500. The image generation apparatus 500 differs from the image generation apparatus 300 only in that the image generation apparatus 500 further includes a pseudo viewpoint image generation unit 510.

The operation of the image generation apparatus 500 will be described in accordance with FIG. 20. In step S110, the viewpoint image acquisition unit 110 acquires and outputs K observation viewpoint images $I_{2k-1}$ ($1 \leq k \leq K$) and K intermediate viewpoint images $I_{2k}$ ($1 \leq k \leq K$).

In step S510, the pseudo viewpoint image generation unit 510 uses K intermediate viewpoint images $I_{2k}$ ($1 \leq k \leq K$) acquired at S110 as inputs to generate a parallax inducing edge $D_\varphi$ having a phase difference from the intermediate viewpoint images $I_{2k}$ being $\varphi$ ($\varphi$ is a real number satisfying $0 < \varphi \leq \pi/2$) by using the intermediate viewpoint images $I_{2k}$ and the observation viewpoint images $I_{2k+1}$ for the intermediate viewpoint images $I_{2k}$ ($1 \leq k \leq K$), generates the pseudo intermediate viewpoint image $I_{2k}^{(R)}$ by adding the parallax inducing edge $D_\varphi$ to the intermediate viewpoint images $I_{2k}$, generates the pseudo intermediate viewpoint image $I_{2k}^{(L)}$ by adding the positive/negative reverse image of the parallax inducing edge $D_\varphi$ to the intermediate viewpoint image $I_{2k}$, and outputs 2K pseudo intermediate viewpoint images $I_{2k}^{(R)}$, $I_{2k}^{(L)}$ ($1 \leq k \leq K$) (where $I_{2K+1}=I_1$).

In step S320, the synthesis ratio determination unit 320 uses K observation viewpoint images $I_{2k-1}$ ($1 \leq k \leq K$) acquired at S110 and 2K pseudo intermediate viewpoint images $I_{2k}^{(R)}$, $I_{2k}^{(L)}$ ($1 \leq k \leq K$) generated at S510 as inputs, determines the synthesis ratio $A_k$ in the block $B_k$ by using the pseudo intermediate viewpoint image $I_{2k-2}^{(R)}$, the observation viewpoint image the pseudo intermediate viewpoint image $I_{2k}^{(L)}$, the pseudo intermediate viewpoint image $I_{2k}^{(R)}$, the observation viewpoint image $I_{2k+1}$, and the pseudo intermediate viewpoint image $I_{2k+2}^{(L)}$, for the block $B_k$ ($1 \leq k \leq K$), and outputs K−1 synthesis ratios $A_k$ ($1 \leq k \leq K$) (where $I_0^{(R)}=I_2^{(R)}$, $I_{2K+1}=I_1$, $I_{2K+2}^{(L)}=I_2^{(L)}$). Here, the synthesis ratio $A_k$ is used when the output image generation unit 330 generates the output image. Hereinafter, the synthesis ratio determination unit 320 will be described with reference to FIGS. 14 to 15. FIG. 14 is a block diagram illustrating a configuration of the synthesis ratio determination unit 320. FIG. 15 is a flowchart illustrating an operation of the synthesis ratio determination unit 320. As illustrated in FIG. 14, the synthesis ratio determination unit 320 includes an initialization unit 325, an image quality evaluation index calculation unit 321, an image quality evaluation index comparison unit 322, and an end condition determination unit 326.

An operation of the synthesis ratio determination unit 320 will be described with reference to FIG. 15. In step S325, the initialization unit 325 sets the value of k, which is a parameter representing the number of repetitions, to 1.

In step S321, the image quality evaluation index calculation unit 321 generates a synthesis image $J_{2k+1}$ from the pseudo intermediate viewpoint image $I_{2k-2}^{(R)}$, the observation viewpoint image $I_{2k-1}$, and the pseudo intermediate viewpoint image $I_{2k}^{(L)}$, and a synthesis image $J_{2k+1}$ from the pseudo intermediate viewpoint image $I_{2k}^{(R)}$, the observation viewpoint image $I_{2k+1}$, and the pseudo intermediate viewpoint image $I_{2k+2}^{(L)}$ for N synthesis ratios $a_n$ (where N is an integer of 1 or greater) ($0 \leq a_n \leq 1$, $1 \leq n \leq N$, n is a parameter representing an integer). The image quality evaluation index calculation unit 321 uses the synthesis images $J_{2k-1}$ and $J_{2k+1}$ to calculate the image quality evaluation index in the observation viewpoint $V_{2k-1}$, the image quality evaluation index in the intermediate viewpoint $V_{2k}$, and the image quality evaluation index in the observation viewpoint $V_{2k+1}$. The image quality evaluation index calculation unit 321 calculates a variation $v_k (a_n)$ of the image quality evaluation index in the block $B_k$ by using the image quality evaluation index in the observation viewpoint $V_{2k-1}$, the image quality evaluation index in the intermediate viewpoint $V_{2k}$, and the image quality evaluation index in the observation viewpoint $V_{2k+1}$ (where $J_{2K+1}=J_1$, $V_{2K+1}=V_1$).

In step S322, the image quality evaluation index comparison unit 322 determines a synthesis ratio $a_n$ that minimizes the variation $v_k$ ($a_n$) ($1 \leq n \leq N$) of the image quality evaluation index in the block $B_k$ as the synthesis ratio A. Note that it is an example to determine the synthesis ratio $A_k$ as the synthesis ratio $a_n$ where the variation $v_k$ ($a_n$) ($1 \leq n \leq N$) in the image quality evaluation index is minimized, and any determination method may be used as long as the image quality evaluation index comparison unit 322 determines the synthesis ratio $A_k$ based on the variation $v_k$ ($a_n$) ($1 \leq n \leq N$) of the image quality evaluation index in the block $B_k$. For example, one of variations $v_k$ ($a_n$) of the image quality evaluation index smaller than a predetermined threshold value may be determined as the synthesis ratio $A_k$, by using the predetermined threshold value (such as an acceptable value as a valuation in the image quality evaluation index defined by an image quality evaluation experiment or the like). Note that in a case where there is no variation $v_k$ ($a_n$) in the image quality evaluation index that is smaller than the threshold value, the synthesis ratio $a_n$ where the variation $v_k$ ($a_n$) ($1 \leq n \leq N$) in the image quality evaluation index is minimized may be determined as the synthesis ratio $A_k$.

In step S326, the end condition determination unit 326 increments k by 1, in a case where k exceeds K (i.e., k>K), outputs K synthesis ratios $A_k$ ($1 \leq k \leq K$), and transitions to the processing of S330, or otherwise the process returns to the processing of S321.

In step S330, the output image generation unit 330 uses the K observation viewpoint images $I_{2k-1}$ ($1 \leq k \leq K$) acquired at S110 and the 2K pseudo intermediate viewpoint images $I_{2k}^{(R)}$, $I_{2k}^{(L)}$ ($1 \leq k \leq K$) generated at S510 and the K synthesis ratios $A_k$ ($1 \leq k \leq K$) determined at S320 as inputs to generate the output images $S_{2k-1}$ of the projector $P_{2k-1}$ from the pseudo intermediate viewpoint images $I_{2k-2}^{(R)}$, the observation viewpoint images and the pseudo intermediate viewpoint images $I_{2k}^{(L)}$ by using the synthesis ratios $A_{k-1}$, $A_k$ for k satisfying $1 \leq k \leq K$, and outputs K output images $S_{2k-1}$ ($1 \leq k \leq K$) (where $A_0 = A_K$, $I_0^{(R)} = I_{2k}^{(R)}$).

According to the invention of the present embodiment, it is possible to suppress unpleasantness associated with fluctuation in image quality caused by the viewer's viewpoint movement. Because the parallax inducing edge is canceled out in the intermediate viewpoint, the image quality of the perceived image at the intermediate viewpoint is improved.

SUPPLEMENTS

Figure 21:
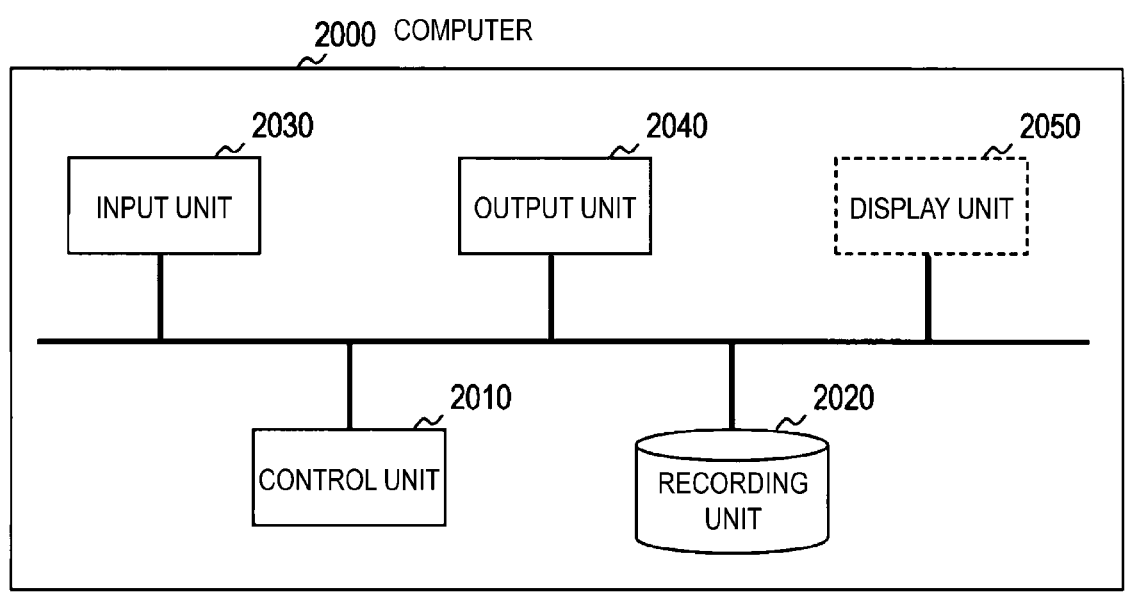
FIG. 21 is a diagram illustrating an example of a functional configuration of a computer realizing each apparatus according to embodiments of the present invention.

FIG. 21 is a diagram illustrating an example of a functional configuration of a computer realizing each apparatus mentioned above. The processing in each of the above-described apparatuses can be performed by causing a recording unit 2020 to read a program for causing a computer to function as each of the above-described apparatuses, and operating the program in a control unit 2010, an input unit 2030, an output unit 2040, and the like.

The apparatus according to the present invention includes, for example, as single hardware entities, an input unit to which a keyboard or the like can be connected, an output unit to which a liquid crystal display or the like can be connected, a communication unit to which a communication apparatus (for example, a communication cable) capable of communication with the outside of the hardware entity can be connected, a Central Processing Unit (CPU, which may include a cache memory, a register, and the like), a RAM or a ROM that is a memory, an external storage apparatus that is a hard disk, and a bus connected for data exchange with the input unit, the output unit, the communication unit, the CPU, the RAM, the ROM, and the external storage apparatuses. An apparatus (drive) capable of reading and writing from and to a recording medium such as a CD-ROM may be provided in the hardware entity as necessary. An example of a physical entity including such hardware resources is a general-purpose computer.

A program necessary to implement the above-described functions, data necessary for processing of this program, and the like are stored in the external storage apparatus of the hardware entity (the present invention is not limited to the external storage apparatus; for example, the program may be read out and stored in a ROM that is a dedicated storage apparatus). For example, data obtained by the processing of the program is appropriately stored in a RAM, the external storage apparatus, or the like.

In the hardware entity, each program and data necessary for the processing of each program stored in the external storage apparatus (or a ROM, for example) are read into a memory as necessary and appropriately interpreted, executed, or processed by a CPU. As a result, the CPU implements a predetermined function (each of components represented by xxx unit, xxx means, or the like).

The present invention is not limited to the above-described embodiment, and appropriate changes can be made without departing from the spirit of the present invention. The processing described in the embodiments are not only executed in time series in the described order, but also may be executed in parallel or individually according to a processing capability of an apparatus that executes the processing or as necessary.

As described above, when a processing function in the hardware entity (the apparatus of the present invention) described in the embodiment is implemented by a computer, processing content of a function that the hardware entity should have is described by a program. By executing this program using the computer, the processing function in the hardware entity is implemented on the computer.

The program in which the processing details are described can be recorded on a computer-readable recording medium. The computer-readable recording medium can be any type of medium such as a magnetic recording apparatus, an optical disc, a magneto-optical recording medium, or a semiconductor memory. Specifically, for example, a hard disk apparatus, a flexible disk, a magnetic tape, or the like can be used as a magnetic recording apparatus, a Digital Versatile Disc (DVD), a DVD-Random Access Memory (RAM), a Compact Disc Read Only Memory (CD-ROM), CD-R (Recordable)/RW (ReWritable), or the like can be used as an optical disc, a Magneto-Optical disc (MO) or the like can be used as a magneto-optical recording medium, and an Electronically Erasable and Programmable-Read Only Memory (EEP-ROM) or the like can be used as a semiconductor memory.

The program is distributed, for example, by selling, giving, or lending a portable recording medium such as a DVD or a CD-ROM with the program recorded on it. Further, the program may be stored in a storage apparatus of a server computer and transmitted from the server computer to another computer via a network, so that the program is distributed.

For example, a computer executing the program first temporarily stores the program recorded on the portable recording medium or the program transmitted from the server computer in the own storage apparatus. When processing is executed, the computer reads the program stored in its own storage apparatus and executes the processing in accordance with the read program. As another execution form of the program, the computer may directly read the program from the portable recording medium and execute processing in accordance with the program. Further, each time the program is transmitted from the server computer to the computer, the computer executes processing in order in accordance with the received program. In another configuration, the processing may be executed through a so-called application service provider (ASP) service in which functions of the processing are implemented just by issuing an instruction to execute the program and obtaining results without transmission of the program from the server computer to the computer. The program in this form is assumed to include a program which is information provided for processing of a computer and is equivalent to a program (data or the like that has characteristics regulating processing of the computer rather than a direct instruction for a computer).

Although the hardware entity is configured by a predetermined program being executed on the computer in the present embodiment, at least a part of the processing content of the hardware entity may be implemented in hardware.

The foregoing description of the embodiments of the present invention has been presented for purposes of illustration and description. The foregoing description does not intend to be exhaustive and does not intend to limit the invention to the precise forms disclosed. Modifications and variations are possible from the teachings above. The embodiments have been chosen and expressed in order to provide the best demonstration of the principles of the present invention, and to enable those skilled in the art to utilize the present invention in numerous embodiments and with addition of various modifications suitable for actual use considered. All such modifications and variations are within the scope of the present invention defined by the appended claims that are interpreted according to the width provided justly lawfully and fairly.

The invention claimed is:

1. An image generation apparatus wherein:
k as a parameter representing an integer, and $P_1$ and $P_3$ as projectors; and
a viewpoint corresponding to an installation position of a projector $P_{2k-1}$ as an observation viewpoint $V_{2k-1}$ ($1 \leq k \leq 2$), a viewpoint corresponding to an intermediate position of installation positions of the two adjacent projectors $P_1$ and $P_3$ as an intermediate viewpoint $V_2$, an image in the observation viewpoint $V_{2k-1}$ as an observation viewpoint image $I_{2k-1}$ ($1 \leq k \leq 2$), and an image in the intermediate viewpoint $V_2$ as an intermediate viewpoint image $I_2$,
the image generation apparatus comprising:
a synthesis ratio determiner configured to determine a synthesis ratio A by using an observation viewpoint image $I_1$, the intermediate viewpoint image $I_2$, and an observation viewpoint image $I_3$; and
an output image generator configured to generate an output image $S_1$ of the projector $P_1$ from the observation viewpoint image $I_1$ and the intermediate viewpoint image $I_2$, and an output image $S_3$ of the projector $P_3$ from the observation viewpoint image $I_3$ and the intermediate viewpoint image $I_2$, by using the synthesis ratio A,
wherein the synthesis ratio determiner includes:
an image quality evaluation index determiner configured to generate a synthesis image $J_1$ from the observation viewpoint image $I_1$ and the intermediate viewpoint image $I_2$, and a synthesis image $J_3$ from the observation viewpoint image $I_3$ and the intermediate viewpoint image $I_2$, for a plurality of synthesis ratios (each synthesis ratio is a real number 0 or greater and 1 or smaller), determine an image quality evaluation index in an observation viewpoint $V_1$, an image quality evaluation index in the intermediate viewpoint $V_2$, and an image quality evaluation index in an observation viewpoint $V_3$ by using the synthesis images $J_1$ and $J_3$, and determine a variation v of an image quality evaluation index by using the image quality evaluation index in the observation viewpoint $V_1$, the image quality evaluation index in the intermediate viewpoint $V_2$, and the image quality evaluation index in the observation viewpoint $V_3$; and
an image quality evaluation index comparator configured to determine the synthesis ratio A based on the variation v of the image quality evaluation index.

2. The image generation apparatus according to claim 1, wherein the image generation apparatus generates a three-dimensional image with motion parallax using a plurality of projectors.

3. An image generation apparatus wherein:
K as an integer greater than or equal to 3, k as an parameter representing an integer, and $P_1, P_3, \ldots, P_{2K-1}$ as projectors installed aligned in a single row;
a viewpoint corresponding to an installation position of a projector $P_{2k-1}$ as an observation viewpoint $V_{2k-1}$ ($1 \leq k \leq K$), a viewpoint corresponding to an intermediate position of installation positions of two adjacent projectors $P_{2k-1}$ and $P_{2k+1}$ as an intermediate viewpoint $V_{2k}$ ($1 \leq k \leq K-1$), an image in the observation viewpoint $V_{2k-1}$ as an observation viewpoint image $I_{2k-1}$ ($1 \leq k \leq K$), and an image in the intermediate viewpoint $V_{2k}$ as an intermediate viewpoint image $I_{2k}$ ($1 \leq k \leq K-1$); and
a set of the observation viewpoint image $I_{2k-1}$, the intermediate viewpoint image $I_{2k}$, and an observation viewpoint image $I_{2k+1}$ as a block $B_k$ ($1 \leq k \leq K-1$),
the image generation apparatus comprising:
a synthesis ratio determiner configured to determine a synthesis ratio $A_k$ in the block $B_k$ by using an intermediate viewpoint image $I_{2k-2}$, the observation viewpoint image $I_{2k-1}$, the intermediate viewpoint image $I_{2k}$, the observation viewpoint image $I_{2k+1}$, and an intermediate viewpoint image $I_{2k+2}$, for the block $B_k$ ($1 \leq k \leq K-1$) (where $I_0 = I_2$, $I_{2K} = I_{2K-2}$); and
an output image generator configured to generate an output image $S_{2k-1}$ of the projector $P_{2k-1}$ from the intermediate viewpoint image $I_{2k-2}$, the observation viewpoint image $I_{2k-1}$, and the intermediate viewpoint image $I_{2k}$ by using synthesis ratios $A_{k-1}, A_k$, for k satisfying $1 \leq k \leq K$ (where $A_0 = A_1$, $A_K = A_{K-1}$, $I_0 = I_2$, $I_{2K} = I_{2K-2}$),
wherein the synthesis ratio determiner includes:
an image quality evaluation index determiner configured to generate a synthesis image $J_{2k-1}$ from the intermediate viewpoint image $I_{2k-2}$, the observation viewpoint image $I_{2k-1}$, and the intermediate viewpoint image $I_{2k}$, and a synthesis image $J_{2k+1}$ from the intermediate viewpoint image $I_{2k}$, the observation viewpoint image $I_{2k+1}$, and the intermediate viewpoint image $I_{2k+2}$, for a plurality of synthesis ratios (each synthesis ratio is a real number 0 or greater and 1 or smaller), determine an image quality evaluation index in the observation viewpoint $V_{2k-1}$, an image quality evaluation index in the intermediate viewpoint $V_{2k}$, and an image quality evaluation index in an observation viewpoint $V_{2k+1}$ by using the synthesis images $J_{2k-1}$, $J_{2k+1}$, and determine a variation $v_k$ of an image quality evaluation index in the block $B_k$ by using the image quality evaluation index in the observation viewpoint $V_{2k-1}$, the image quality evaluation index in the intermediate viewpoint $V_{2k}$, and the image quality evaluation index in the observation viewpoint $V_{2k+1}$; and an image quality evaluation index comparator configured to determine the synthesis ratio $A_k$ based on the variation $v_k$ of the image quality evaluation index in the block $B_k$.

4. The image generation apparatus according to claim 3, wherein the image generation apparatus generates a three-dimensional image with motion parallax using a plurality of projectors.

5. The image generation apparatus according to claim 4, wherein the three dimensional image is viewable by the naked eye based on a linear blending mechanism.

6. The image generation apparatus according to claim 5, wherein the three dimensional image is viewable by the naked eye based on a linear blending mechanism.

7. An image generation apparatus wherein:

K as an integer greater than or equal to 3, k as an parameter representing an integer, and $P_1$, $P_3$, . . . , $P_{2K-1}$ as projectors installed aligned in a circular alignment, the projectors being for projecting an image onto a circular screen;

a viewpoint corresponding to an installation position of a projector $P_{2k-1}$ as an observation viewpoint $V_{2k-1}$ (1≤k≤K), a viewpoint corresponding to an intermediate position of installation positions of two adjacent projectors $P_{2k-1}$ and $P_{2k+1}$ (where $P_{2K+1}=P_1$) as an intermediate viewpoint $V_{2k}$ (1≤k≤K), an image in the observation viewpoint $V_{2k-1}$ as an observation viewpoint image $I_{2k-1}$ (1≤k≤K), and an image in the intermediate viewpoint $V_{2k}$ as an intermediate viewpoint image $I_{2k}$ (1≤k≤K); and a set of the observation viewpoint image $I_{2k-1}$, the intermediate viewpoint image $I_{2k}$, and an observation viewpoint image $I_{2k+1}$ (where $I_{2K+1}=I_1$) as a block $B_k$ (1≤k≤K), the image generation apparatus comprising:

a synthesis ratio determiner configured to determine a synthesis ratio $A_k$ in the block $B_k$ by using an intermediate viewpoint image $I_{2k-2}$, the observation viewpoint image $I_{2k-1}$, the intermediate viewpoint image $I_{2k}$, the observation viewpoint image $I_{2k+1}$, and an intermediate viewpoint image $I_{2k+2}$, for the block $B_k$ (1≤k≤K) (where $I_0=I_{2K}$, $I_{2K+1}=I_1$, $I_{2K+2}=I_2$); and an output image generator configured to generate an output image $S_{2k2-1}$ of the projector $P_{2k-1}$ from the intermediate viewpoint image $I_{2k-2}$, the observation viewpoint image $I_{2k-1}$, and the intermediate viewpoint image $I_{2k}$ by using synthesis ratios $A_{k-1}$, $A_k$, for k satisfying 1≤k≤K (where $A_0=A_K$, $I_0=I_{2K}$), wherein the synthesis ratio determiner includes:

an image quality evaluation index determiner configured to generate a synthesis image $J_{2k-1}$ from the intermediate viewpoint image $I_{2k-2}$, the observation viewpoint image and the intermediate viewpoint image $I_{2k}$, and a synthesis image $J_{2k+1}$ from the intermediate viewpoint image $I_{2k}$, the observation viewpoint image $I_{2k+1}$, and the intermediate viewpoint image $I_{2k+2}$, for a plurality of synthesis ratios (each synthesis ratio is a real number 0 or greater and 1 or smaller), determine an image quality evaluation index in the observation viewpoint $V_{2k-1}$, an image quality evaluation index in the intermediate viewpoint $V_{2k}$, and an image quality evaluation index in an observation viewpoint $V_{2k+1}$ by using the synthesis images $J_{2k-1}$, $J_{2k+1}$, and determine a variation $v_k$ of an image quality evaluation index in the block $B_k$ by using the image quality evaluation index in the observation viewpoint $V_{2k-1}$, the image quality evaluation index in the intermediate viewpoint $V_{2k}$, and the image quality evaluation index in the observation viewpoint $V_{2k+1}$ (where $J_{2K+1}=J_1$, $V_{2K+1}=V_1$); and an image quality evaluation index comparison unit that determines the synthesis ratio $A_k$ based on the variation $v_k$ of the image quality evaluation index in the block $B_k$.

8. The image generation apparatus according to claim 7, wherein the image generation apparatus generates a three-dimensional image with motion parallax using a plurality of projectors.

9. The image generation apparatus according to claim 8, wherein the three dimensional image is viewable by the naked eye based on a linear blending mechanism.

* * * * *